United States Patent
Jeffs et al.

(10) Patent No.: US 9,032,296 B1
(45) Date of Patent: May 12, 2015

(54) USER INTERFACE FOR DISPLAYING HIGHLIGHTS OF AN EVENT OR PLURALITY OF EVENTS

(75) Inventors: Alistair E. Jeffs, Los Angeles, CA (US); David E. Feldstein, Santa Monica, CA (US); Jon M. Dean, Torrance, CA (US); Yves S. Lin, Playa Vista, CA (US); David E. Shanks, Los Angeles, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 1096 days.

(21) Appl. No.: 12/200,863

(22) Filed: Aug. 28, 2008

Related U.S. Application Data

(60) Provisional application No. 60/968,837, filed on Aug. 29, 2007.

(51) Int. Cl.
*G06F 3/00* (2006.01)
*G06F 3/0481* (2013.01)

(52) U.S. Cl.
CPC .................................. *G06F 3/0481* (2013.01)

(58) Field of Classification Search
USPC ............ 715/718, 719, 716; 725/151, 153, 41, 725/45
See application file for complete search history.

(56) References Cited

U.S. PATENT DOCUMENTS

| | | | |
|---|---|---|---|
| 5,860,862 A | 1/1999 | Junkin | |
| 6,295,646 B1 * | 9/2001 | Goldschmidt Iki et al. .... | 725/41 |
| 6,536,041 B1 | 3/2003 | Knudson et al. | |
| 7,281,220 B1 * | 10/2007 | Rashkovskiy ................ | 715/838 |
| 7,403,910 B1 | 7/2008 | Hastings et al. | |
| 7,712,117 B1 * | 5/2010 | Mohr .............................. | 725/41 |
| 7,988,560 B1 | 8/2011 | Heller et al. | |
| 8,397,257 B1 | 3/2013 | Barber | |
| 2002/0157101 A1 | 10/2002 | Schrader et al. | |
| 2003/0177503 A1 | 9/2003 | Sull et al. | |
| 2003/0226152 A1 | 12/2003 | Billmaier et al. | |
| 2004/0025180 A1 | 2/2004 | Begeja et al. | |
| 2004/0040041 A1 | 2/2004 | Crawford | |
| 2004/0056879 A1 | 3/2004 | Erdelyi | |
| 2004/0073437 A1 * | 4/2004 | Halgas et al. .................... | 705/1 |
| 2004/0117831 A1 | 6/2004 | Ellis et al. | |
| 2004/0205504 A1 * | 10/2004 | Phillips ....................... | 715/501.1 |
| 2004/0255249 A1 * | 12/2004 | Chang et al. .................. | 715/723 |
| 2005/0015803 A1 * | 1/2005 | Macrae et al. .................. | 725/41 |
| 2005/0071782 A1 * | 3/2005 | Barrett et al. .................. | 715/838 |
| 2005/0144302 A1 | 6/2005 | Kirkpatrick et al. | |
| 2005/0235312 A1 * | 10/2005 | Karaoguz et al. ............... | 725/38 |
| 2005/0239549 A1 | 10/2005 | Salvatore et al. | |

(Continued)

OTHER PUBLICATIONS

Non-final Office action dated Jul. 29, 2011 in U.S. Appl. No. 12/200,879, filed Aug. 28, 2008 by Alistair E. Jeffs et al.

(Continued)

*Primary Examiner* — Rashawn Tillery

(57) ABSTRACT

A method and system for providing highlight clips to a user device includes the user device having a display with a user interface and a content processing system communicating a plurality of highlight links to the user device. The user device displays the plurality of highlight links on the display and communicates a selection signal to the content processing system. The content processing system communicates a highlight clip corresponding to the selection signal to the user device. The user device displays the content clip in the user interface.

34 Claims, 38 Drawing Sheets

(56) References Cited

U.S. PATENT DOCUMENTS

| | | |
|---|---|---|
| 2006/0252476 A1 | 11/2006 | Bahou |
| 2007/0074115 A1* | 3/2007 | Patten et al. .................. 715/716 |
| 2007/0157248 A1* | 7/2007 | Ellis ................................ 725/47 |
| 2007/0204308 A1 | 8/2007 | Nicholas et al. |
| 2007/0240232 A1 | 10/2007 | Pino et al. |
| 2008/0064490 A1 | 3/2008 | Ellis |
| 2008/0066011 A1 | 3/2008 | Urrabazo et al. |
| 2008/0066111 A1 | 3/2008 | Ellis et al. |
| 2008/0086688 A1* | 4/2008 | Chandratillake et al. ..... 715/719 |
| 2008/0184117 A1* | 7/2008 | Alsbury et al. ................ 715/719 |
| 2008/0235586 A1 | 9/2008 | Chou et al. |
| 2009/0119013 A1 | 5/2009 | O'Malley |
| 2010/0093415 A1 | 4/2010 | Kasten |

OTHER PUBLICATIONS

Non-final Office action dated Aug. 12, 2013 in U.S. Appl. No. 11/828,605, filed Jul. 26, 2007 by Michael R. Munsell.

* cited by examiner

PLAYER PICKER

By Rank

- ● 1  LaDainian Tomlinson RB,SD
- ○ 2  Brian Westbrook, RB, PHI
- ○ 3  Steven Jackson RB,STL
- ○ 4  Tom Brady QB,NE
- ● 5  Adrian Peterson RB,MIN
- ○ 6  Peyton Manning QB,IND

- ○ 7  Clinton Portis RB,WAS
- ○ 8  Frank Gore RB,SF
- ○ 9  Manion Barber RV,DAL
- ● 10 Marshawn Lynch RB,BUF
- ○ 11 Larry Johnson RB,KC
- ○ 12 Joseph Addai RB,IND Sort By: Team, Alphabetical Next Page

FIG. 16b

USER INTERFACE FOR DISPLAYING HIGHLIGHTS OF AN EVENT OR PLURALITY OF EVENTS

CROSS-REFERENCE TO RELATED APPLICATIONS

This application claims the benefit of U.S. Provisional Application No. 60/968,837, filed on Aug. 29, 2007. The entire disclosure of the above application is incorporated herein by reference.

TECHNICAL FIELD

The present disclosure relates to providing content and data to user devices and, more specifically, to a system and method for displaying and communicating highlight for an event.

BACKGROUND

The statements in this section merely provide background information related to the present disclosure and may not constitute prior art.

Satellite television has become increasingly popular due to the wide variety of content and the quality of content available. A satellite television system typically includes a set top box that is used to receive the satellite signals and decode the satellite signals for use on a television. The set top box typically has a memory associated therewith. The memory may include a digital video recorder or the like as well as the operating code for the set top box.

Satellite television systems typically broadcast content to a number of users simultaneously in a system. Satellite television systems also offer subscription or pay-per-view access to broadcast content. Access is provided using signals broadcast over the satellite. Once access is provided the user can access the particular content. The broadcasting of a large selection of channels and pay-per-view programs uses a considerable amount of satellite resources.

Content providers are increasingly trying to determine additional ways to provide content to users. Some content may be desired by a small number of customers. In such a case using valuable satellite resources at peak viewing times may not be cost effective. Less popular content may be broadcast by satellite at less popular viewing times, or may be available for downloading on demand via a broadband connection. Such content may be received and stored by a digital video recorder for later viewing.

Sporting events and other live events may also be available to customers in a package. Sporting events in particular have many fans. One example of a sport with many fans is football. A majority of football games are played on Sunday afternoons. Many football games overlap. Changing between channels may be inconvenient to ascertain the status of the games. Key scoring events may be missed for other games not being displayed. Also, if a subscriber is away from their television information regarding the event may not be provided to them.

SUMMARY

The present disclosure provides a system that is capable of supporting many types of devices and various types of processing to accommodate the various types of devices. The disclosure provides highlights and a method of providing and accessing highlights.

In one aspect of the disclosure, a method includes communicating a plurality of highlight links to a user device, displaying the plurality of highlight links, selecting a first link of the plurality of highlight links to form a selection signal, communicating the selection signal to a content processing system, communicating a highlight clip corresponding to the selection signal to the user device and displaying the highlight clip in a user interface.

In another aspect of the disclosure, a system includes a user device having a display with a user interface and a content processing system communicating a plurality of highlight links to the user device. The user device displays the plurality of highlight links on the display and communicates a selection signal to the content processing system. The content processing system communicates a highlight clip corresponding to the selection signal to the user device. The user device displays the content clip in the user interface.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 16B is a user interface for a player picker suitable for selecting players for a fantasy league.

DETAILED DESCRIPTION

Figure 1:
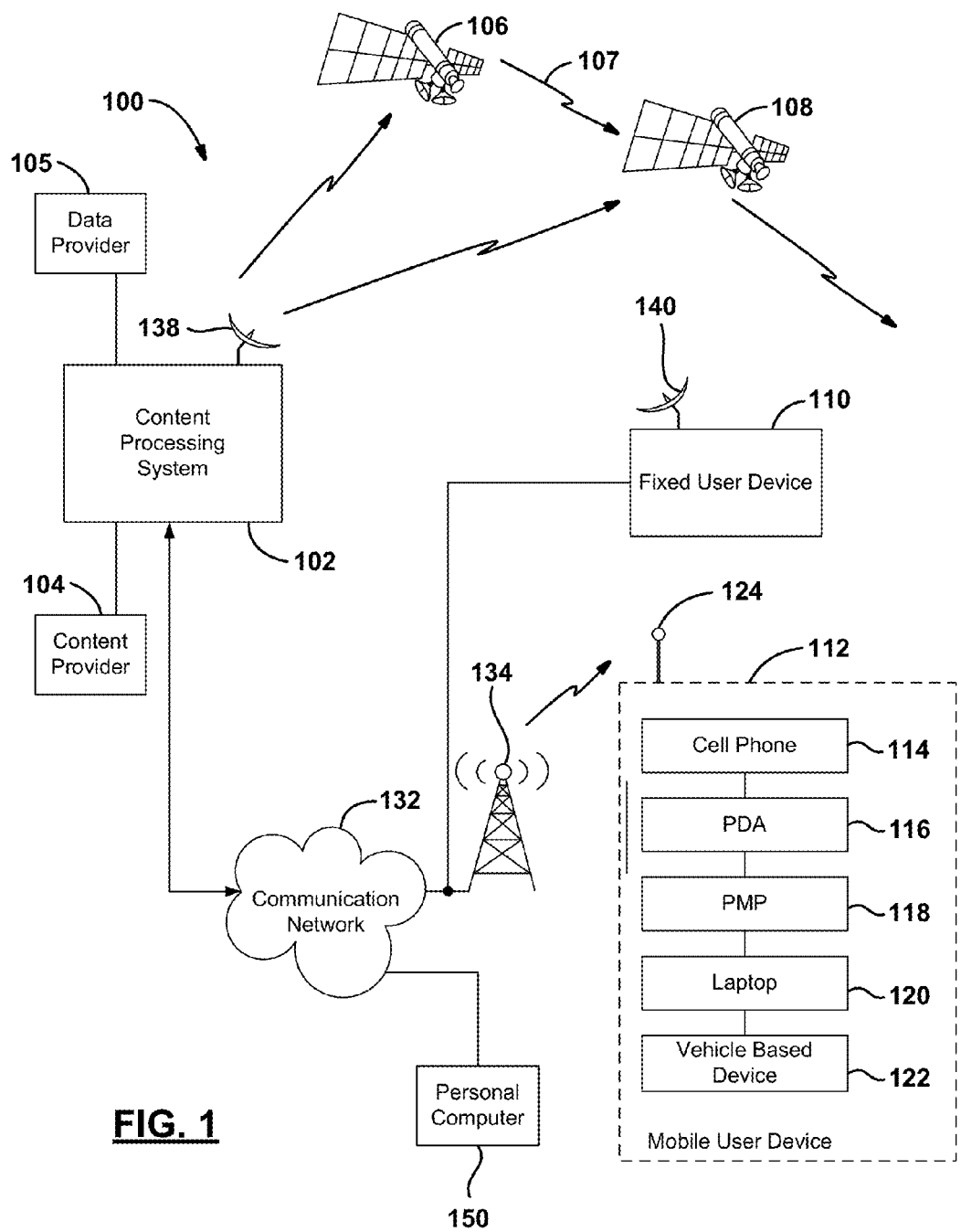
FIG. 1 is a schematic illustration of a communication system according to the disclosure.

The following description is merely exemplary in nature and is not intended to limit the present disclosure, application, or uses. For purposes of clarity, the same reference numbers will be used in the drawings to identify similar elements. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

The following system is described with respect to a satellite system and a broadband system. The broadband distribution system may be implemented in a cable or telephone-type system. An optical fiber may also be used in the broadband system. Wireless distribution may also be used in the broadband distribution system.

While the following disclosure is made with respect to example DIRECTV® broadcast services and systems, it should be understood that many other delivery systems are readily applicable to disclosed systems and methods. Such systems include other wireless distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, the different functions collectively allocated among a head end (HE), integrated receiver/decoders (IRDS) and a content delivery network (CDN) as described below can be reallocated as desired without departing from the intended scope of the present patent.

Further, while the following disclosure is made with respect to the delivery of video (e.g., television (TV), movies, music videos, etc.), it should be understood that the systems and methods disclosed herein could also be used for delivery of any media content type, for example, audio, music, data files, web pages, etc. Additionally, throughout this disclosure reference is made to data, content, information, programs, movies, assets, video data, etc., however, it will be readily apparent to persons of ordinary skill in the art that these terms are substantially equivalent in reference to the example systems and/or methods disclosed herein. As used herein, the term title will be used to refer to, for example, a movie itself and not the name of the movie.

The following description is set forth with sporting events. More specifically the following description provides examples for National Football League® (NFL) football. The following examples may be easily adapted to other sporting events or combinations of sporting events such as the Summer or Winter Olympics. Non-sporting events may also be supported by the system including but not limited to reality television shows, news, entertainment and business programming.

Referring now to FIG. 1, a communication system 100 includes a content processing system 102 that is used as a processing and transmission source, a plurality of content providers, one of which is shown at reference numeral 104. Data such as data feeds may be received from a data provider 105. The data provider 105 may be physically together or separate from the content provider. The data provider 105 may provide data in a different manner from the content provider 104. The data may be a continuous stream assembled from many sources. For example, the data may be directly received from scoreboards of various sporting events, manually input data, or data from other services.

The communication system may also include a first satellite 106. A second satellite 108 may also be incorporated into the system. The satellites 106, 108 may be used to communicate different types of information or different portions of various content from the content processing system 102. The system 100 also includes a plurality of fixed user devices 110 such as integrated receiver/decoders (IRDs). Wireless communications are exchanged between the content processing system 102 and the fixed user devices 110 through one or more of the satellites 106, 108. The wireless communications may take place at any suitable frequency, such as, for example, Ka band and/or Ku-band frequencies.

A mobile user device 112 may also be incorporated into the system. The mobile user device 112 may include, but is not limited to, a cell phone 114, a personal digital assistant 116, a portable media player 118, a laptop computer 120, or a vehicle-based device 122. It should be noted that several mobile devices 112 and several fixed user devices 110 may be used in the communication system 100. The mobile devices 112 may each have a separate antenna generally represented by antenna 124. The mobile devices may be web-based devices using WiFi, WiMax, cellular broadband or wireless broadband systems. The mobile devices may include a WAP browser or HTML for example.

In addition to communication via the satellites 106, 108, various types of information such as security information, encryption-decryption information, data, video, content, or content portions may be communicated terrestrially. Various communication means such as a communication network 132 include, but are not limited to, the public switched telephone network (PSTN), a terrestrial wireless system, a broadband system, stratospheric platform, an optical fiber, or the like may be used to terrestrially communicate with the fixed user device 110 or the mobile user device 112. To illustrate the terrestrial wireless capability an antenna 134 is illustrated for wireless terrestrial communication to the mobile user device 112.

Information, data or content provided to content processing system 102 from the media source 104 may be transmitted, for example, via an uplink antenna 138 to the satellite(s) 106,108, one or more of which may be a geosynchronous or geo-stationary satellite, that, in turn, rebroadcast the information over broad geographical areas on the earth that include the user devices 110, 112. The satellites may have inter-satellite links 107 that allow the satellites to communicate signals therebetween. Among other things, the example content processing system 102 of FIG. 1 provides program material or content to the user devices 110, 112 and coordinates with the user devices 110, 112 to offer subscribers pay-per-view (PPV) program services and broadband services, including billing and associated decryption of video programs. Non-PPV (e.g. free or subscription) programming may also be received. To receive the information rebroadcast by satellites 106, 108, each for user device 110 is communicatively coupled to a receiver or downlink antenna 140.

Lists of available content may also be communicated by way of the communication network 132 or the satellites 106, 108. The lists may also be made available at a web server. The lists and content may be communicated separately through different means or through the same means.

Security of assets broadcast via the satellites 106, 108 may be established by applying encryption and decryption to assets or content during content processing and/or during broadcast (i.e., broadcast encryption). For example, an asset can be encrypted based upon a control word (CW) known to the content processing system 102 and known to the user devices 110, 112 authorized to view and/or playback the asset. In the illustrated example communication system 100, for each asset the content processing system 102 generates a control word packet (CWP) that includes, among other things, a time stamp, authorization requirements and an input value and then determines the control word (CW) for the asset by computing a cryptographic hash of the contents of the CWP. The CWP is also broadcast to the user devices 110, 112 via the satellites 106, 108. The user devices authorized to view and/or playback the broadcast encrypted asset will be able to correctly determine the CW by computing a cryptographic hash of the contents of the received CWP. If the user device 110 is not authorized, the IRD 110 will not be able to determine the correct CW that enables decryption of the received broadcast encrypted asset. The CW may be changed periodically (e.g., every 30 seconds) by generating and broadcasting a new CWP. In an example, a new CWP is generated by updating the timestamp included in each CWP. Alternatively, a CWP could directly convey a CW either in encrypted or unencrypted form. Other examples of coordinated encryption and decryption abound, including for example, public/private key encryption and decryption.

A personal computer 150 may also be in communication with communication network 132. As will be described below, the personal computer may include a web browser or other device for communicating with devices through the communication network 132. The personal computer 150 may be used to receive various types of data and video from the content processing system 102. For example, sports scores, video clips, and streaming video may all be provided from the content processing system 102. The personal computer 150 may be a wired connection to the communication network 132. The mobile user device includes a laptop 120 which, in turn, is a wireless device. Of course, the personal computer 150 may also be made wireless using appropriate wireless connection cards and a wireless router.

Figure 2A:
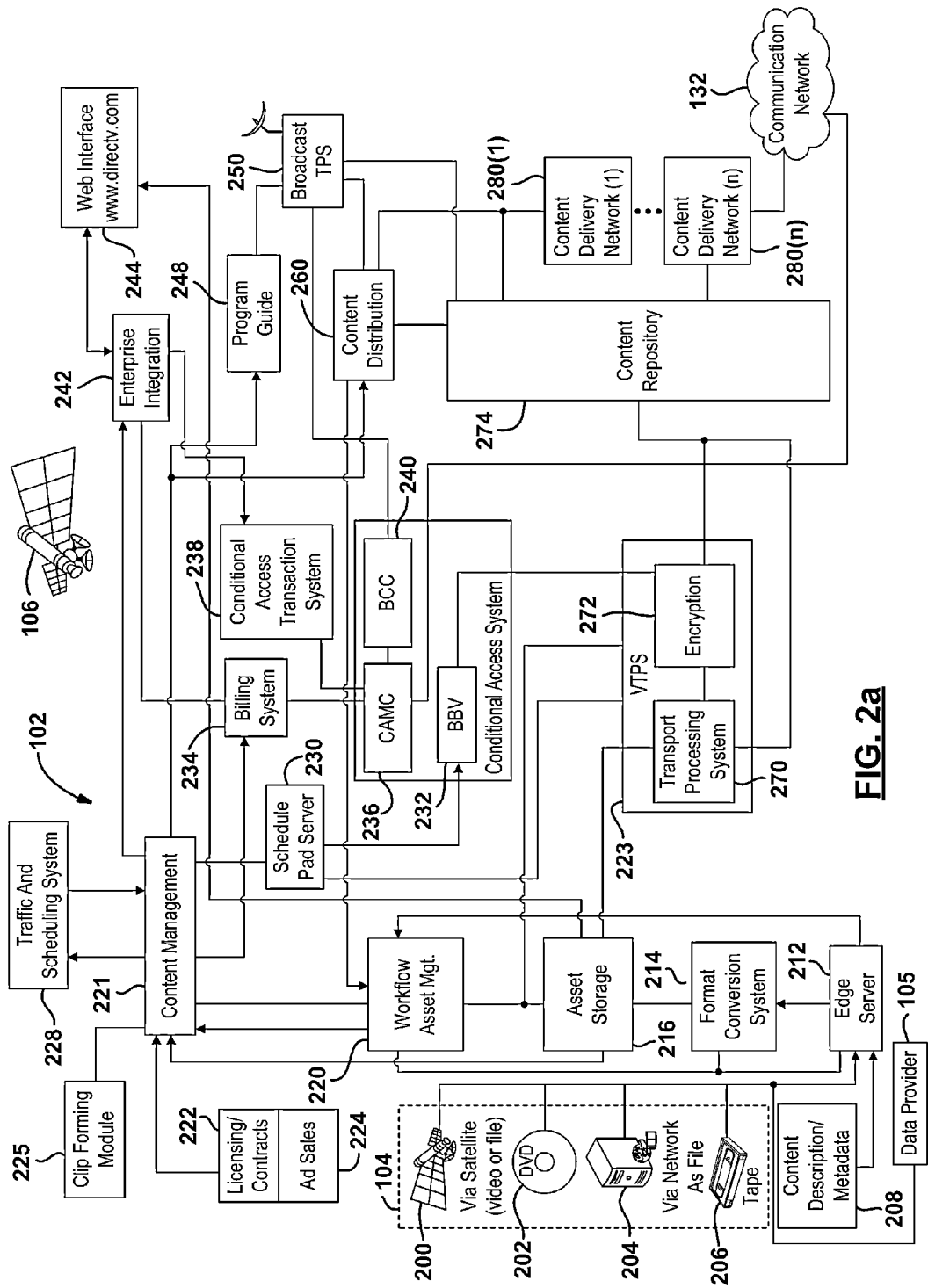
FIG. 2a is a detailed block diagrammatic view of the content processing system of FIG. 1.

Referring now to FIG. 2a, the content processing system 102 of FIG. 1 is illustrated in further detail. The content provider 104 may include various types of content providers, including those that provide content by way of a satellite 200, DVD 202, via a network as a file in 204, by way of tapes and other means. The content provider 104 may also provide a content description and other metadata 208 to the system. Data may be provided from the data provider 105. An input server 212 may receive the various content, associated metadata and data and convert the format in a format conversion system 214. A house format asset storage server 216 may be used to store the content asset in a house format. Still image files, trailers, and other information may also be stored in the house format asset storage server. A workflow management system 220 is used to control the format conversion system 214 and the server 212. Also, the workflow management system 220 is coupled to the house format asset storage server 216 and performs ingest control. The house format asset storage server 216 provides still images to a content management system 221 and house format file, video and audio files to the video transport processing system 223.

The VTPS 223 may encode the packets containing the content. The encoder may encode the data into various transport formats such as DIRECTV® proprietary formats, or industry standard formats. The encoded data is then packetized into a stream of data packets by a packetizer 270 that also attaches a header to each data packet to facilitate identification of the contents of the data packet such as, for example, a sequence number that identifies each data packet's location within the stream of data packets (i.e., a bitstream). The header also includes a program identifier (PID) (e.g., a service channel identifier (SCID)) that identifies the program to which the data packet belongs.

The stream of data packets (i.e., a bitstream) is then broadcast encrypted by, for example, the well-known Advanced Encryption Standard (AES) or the well-known Data Encryption Standard (DES). In an example, only the payload portion of the data packets are encrypted thereby allowing a user device 110 to filter, route and/or sort received broadcast encrypted data packets without having to first decrypt the encrypted data packets.

The content management system 221 generally controls the overall movement and distribution of contents through the content processing system 102.

A licensing and contract information 222 and ads from ad sales 224 may be provided to the content management system 221. That is, licensing information, tier assignments, pricing and availability may be provided to the content management system. Asset information, file names and durations may be exchanged between the content management system 221 and the workflow management system 220. The asset information, such as file names and durations, may be determined at the server 212 that is coupled to the workflow management system 220.

The Content Management System (CMS) 221 in combination with the SPS (230) is used to provide the requested channel, program associated data (PAD), channel information and program information packets (PIPs). The CMS 221 may schedule content processing for a plurality of received assets based on a desired program lineup to be offered by the communication system 100. For example, a live TV program for which a high demand for reruns might be expected could be assigned a high priority for content processing.

A clip-forming module 225 may be a standalone module or a module associated within the content management system 221. The clip-forming module may be a manual or automated process for reviewing clips and associating various data or metadata with the clip. The clips may be highlight clips that are determined from various plays or scoring events within a content stream, such as a sporting event. The clips may be formed from an ongoing live event. The clips may be formed continually during an event. The clip-forming module 225 may associate the team names, the players associated with the particular clip, the relative time period of the clip and other information deemed important to the particular clip. The clips, such as a highlight clip, may be stored ultimately in the content repository 274 for distribution through one of the content delivery networks 280 (1-*n*). The clips may be a portion of the event signal and may be formatted in different ways for distribution through various delivery networks. The resolution may be part of the change.

The data from the data provider 105 may also be stored in the content repository 274 and form part of a web-based interface. The data may be continually updated so that the user interfaces provided to customers may also be updated regularly. Wi video and data may also pass through the content distribution system 260 so that it may be provided to the broadcast TPS 250 or the content delivery network 280.

A schedule PAD server (SPS) 230 may be coupled to the CMS and is used to generate a broadband video PAD that is communicated to a conditional access system for broadband video 232. The conditional access system for broadband video 232 may be used to generate control words and control word packet in pairs and provide those to the video transport processing system 223.

In the illustrated example of FIG. 2a, users of the user devices 110 (of FIG. 1) are charged for subscription services and/or asset downloads (e.g., PPV TV) and, thus, the content processing system 102 includes a billing system 234 to track and/or bill subscribers for services provided by the system 100. For example, the billing system 234 records that a user has been authorized to download a movie and once the movie has been successfully downloaded the user is billed for the movie. Alternatively, the user may not be billed unless the movie has been viewed.

A billing system 234 receives pricing and availability information from the content management system 221. A conditional access system 236 receives callback information from the communication network 132. The conditional access system may be used to generate authorizations, pay-per-view billing data, and callback data from the billing system 234. Remote record requests may also be provided from the conditional access transaction system 238. A conditional access system BCC 240 may be used to generate a conditional access packet from the information from the conditional access system 236.

The billing system 234 may generate purchase data that is provided to the enterprise integration (EI) block 242. The enterprise integration block 242 may generate remote record requests to the conditional access transaction system 238. Remote record requests may be generated through a web interface such as DIRECTV.com in block 244. Various ordering information, such as ordering broadband video, pay-per-view, and various services may be received at the web interface 244. Various trailers may also be accessed by the users through the web interface 244 provided from the house format asset storage server 216. Enterprise integration block 242 may also receive guide information and metadata from the content management system 221.

Titles, description and various categories from the content management system 221 may be provided to the advanced program guide system 248. The program guide system 248 may be coupled to a satellite broadcasting system such as a broadcast transport processing system 250 that broadcasts content to the users through the satellite 106, 108.

The program guide data generated by the program guide system 248 may include information that is used to generate a display of guide information to the user, wherein the program guide may be a grid guide and informs the user of particular programs that are broadcast on, particular channels at particular times. The program guide may be a list of content available through a communication means. A program guide may also include information that a user device uses to assemble programming for display to a user. For example, the program guide may be used to tune to a channel on which a particular program is offered. The program guide may also contain information for tuning, demodulating, demultiplexing, decrypting, depacketizing, or decoding selected programs.

Content files may also be provided from the content management system 221 to the content distribution system 260.

Referring back to the video transport processing system 223, the video transport processing system 223 includes a transport packaging system 270. The transport processing system 270 creates pre-packetized unencrypted files. An encryption module 272 receives the output of the transport processing system and encrypts the packets. Fully packaged and encrypted files may also be stored in the content repository 274. Encryption may take place in the data portion of a packet and not the header portion.

One or more content delivery networks 280 may be used to provide content files such as encrypted or unencrypted and packetized files to the communication network 132 for distribution to the user devices 110, 112. The content distribution system 260 may make requests for delivery of the various content files and assets through the communication network 132. The content distribution system 260 also generates satellite requests and broadcasts various content and assets through the broadcast transport processing system 250. Some content delivery networks may be dedicated to a certain type of service or communication means. As will be described in FIG. 2b, one content delivery network may be dedicated to web service. Others may be dedicated to mobile phone service. Still others may be dedicated to other types of communication.

The communication network 132 may be a web-based system such as the Internet 122 which is a multiple-point-to-multiple-point communication network. However, persons of ordinary skill in the art will appreciate that point-to-point communications may also be provided through the communication network 132. For example, downloads of a particular content file from a content delivery network may be communicated to a particular user device. Such file transfers and/or file transfer protocols are widely recognized as point-to-point communications or point-to-point communication signals and/or create point-to-point communication paths, even if transported via a multi-point-to-multi-point communication network such as the Internet. It will be further recognized that the communication network 132 may be used to implement any variety of broadcast system where a broadcast transmitter may transmit any variety of data or data packets to any number of or a variety of clients or receivers simultaneously. Moreover, the communication network 132 may be used to simultaneously provide broadcast and point-to-point communications and/or point-to-point communication signals from a number of broadcast transmitters or content delivery networks 280.

The content delivery network 280 may be implemented using a variety of techniques or devices. For instance, a plurality of Linux-based servers with fiber optic connections may be used. Each of the content delivery networks 280 may include servers that are connected to the Internet or the communication network 132. This allows the user devices to download information or content (example, a movie) from the content delivery network 280. The content delivery network 280 may act as a cache for the information provided from the content repository 274. A particular user device may be directed to a particular content delivery network 280 depending on the specific content to be retrieved. An Internet uniform resource locator (URL) may be assigned to a movie or other content. Further, should one of the delivery networks 280 have heavy traffic, the content delivery network may be changed to provide faster service. In the interest of clarity and ease of understanding, throughout this disclosure reference will be made to delivering, downloading, transferring and/or receiving information, video, data, etc. by way of the content delivery network 280. However, persons of ordinary skill in the art will readily appreciate that information is actually delivered, downloaded, transferred, or received by one of the Internet-based servers in or associated with the content delivery network 280.

It should be appreciated that the content delivery network 280 may be operated by an external vendor. That is, the operator of the content delivery network 280 may not be the same as the operator of the remaining portions of the content processing system 102. To download files from the content delivery network 280, user devices 110, 112 may implement an Internet protocol stack with a defined application layer and possibly a download application provided by a content delivery network provider. In the illustrated example, file transfers are implemented using standard Internet protocols (file transfer protocol FTP), hyper text transfer protocol (HTTP), etc. Each file received by the user device may be checked for completeness and integrity and if a file is not intact, missing, and/or damaged portions of the files may be delivered or downloaded again. Alternatively, the entire file may be purged from the IRD and delivered or downloaded again.

The broadcast transport processing system 250 may provide various functions, including packetizing, multiplexing and modulating, and uplink frequency conversion. RF amplification may also be provided in the broadcast transport processing system 250.

Wireless delivery via the satellites 106, 108 may simultaneously include both files (e.g., movies, pre-recorded TV shows, games, software updates, asset files, etc.) and/or live content, data, programs and/or information. Wireless delivery via the satellites 106, 108 offers the opportunity to deliver, for example, a number of titles (e.g., movies, pre-recorded TV shows, etc.) to virtually any number of customers with a single broadcast. However, because of the limited channel capacity of the satellites 106, 108, the number of titles (i.e., assets) that can be provided during a particular time period is restricted.

In contrast, Internet-based delivery via the CDN 280 can support a large number of titles, each of which may have a narrower target audience. Further, Internet-based delivery is point-to-point (e.g., from an Internet-based content server to a user device 110, 112) thereby allowing each user of the user device 110, 112 to individually select titles. Allocation of a title to satellite and/or Internet-based delivery or content depends upon a target audience size and may be adjusted over time. For instance, a title having high demand (i.e., large initial audience) may initially be broadcast via the satellites 106, 108, then, over time, the title may be made available for download via the CDN 280 when the size of the target audience or the demand for the title is smaller. A title may simultaneously be broadcast via the satellites 106, 108 and be made available for download from the CDN 280 via the communication network 132.

In the example communication system 100, each asset (e.g., program, title, content, game, TV program, etc.) is pre-packetized and, optionally, pre-encrypted and then stored as a data file (i.e., an asset file). Subsequently, the asset file may be broadcast via the satellites 106, 108 and/or sent to the CDN 280 for download via the CDN 280 (i.e., Internet-based delivery). In particular, if the data file is broadcast via the satellites 106, 108, the data file forms at least one payload of a resultant satellite signal. Likewise, if the data file is available for download via the CDN 280, the data file forms at least one payload of a resultant Internet signal.

It will be readily apparent to persons of ordinary skill in the art that even though at least one payload of a resultant signal includes the data file regardless of broadcast technique (e.g., satellite or Internet), how the file is physically transmitted may differ. In particular, transmission of data via a transmission medium (e.g., satellite, Internet, etc.) comprises operations that are: (a) transmission medium independent and b) transmission medium dependent. For example, transmission protocols (e.g., transmission control protocol/Internet protocol (TCP/IP), user datagram protocol (UDP), encapsulation, etc.) and/or modulation techniques (e.g., quadrature amplitude modulation (QAM), forward error correction (FEC), etc.) used to transmit a file via Internet signals (e.g., over the Internet 122) may differ from those used via satellite (e.g., the satellites 106, 108). In other words, transmission protocols and/or modulation techniques are specific to physical communication paths, that is, they are dependent upon the physical media and/or transmission medium used to communicate the data. However, the content (e.g., a file representing a title) transported by any given transmission protocol and/or modulation is agnostic of the transmission protocol and/or modulation, that is, the content is transmission medium independent.

The same pre-packetized and, optionally, pre-encrypted, content data file that is broadcast via satellite may be available for download via Internet, and how the asset is stored, decoded and/or played back by the user devices 110 is independent of whether the program was received by the user devices 110 via satellite or Internet. Further, because the example content processing system 102 of FIG. 1 broadcasts a live program and a non-live program (e.g., a movie) by applying the same encoding, packetization, encryption, etc., how a program (live or non-live) is stored, decoded and/or played back by the user devices 110 is also independent of whether the program is live or not. Thus, user devices 110, 112 may handle the processing of content, programs and/or titles independent of the source(s) and/or type(s) of the content, programs and/or titles. In particular, example delivery configurations and signal processing for the example content delivery system of FIG. 2a are discussed in detail below.

Figure 2B:
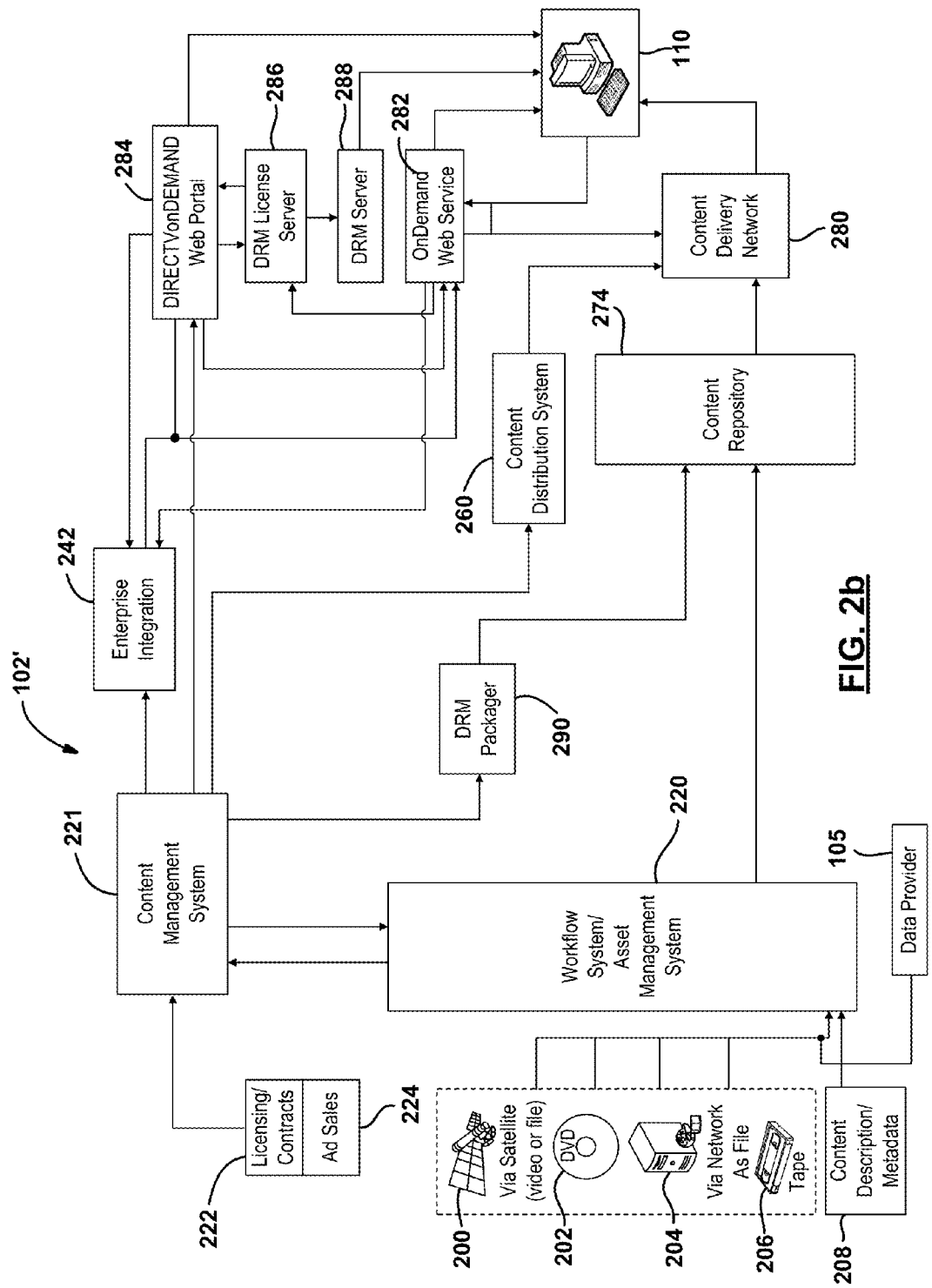
FIG. 2b is a detailed block diagrammatic view of an alternative the content processing system of FIG. 1 for web based devices.

Referring now to FIG. 2b, an alternative content processing system 102' suitable for web-based systems is illustrated. The system in FIG. 2b may also be used together with that of FIG. 2a so that different methods for distribution can take place. The content processing system 102' shares many components with those of the content processing system 102. Therefore, the detail associated with these elements will not be described again. The same reference numerals are used to describe the same elements. This embodiment is different from the embodiment illustrated in FIG. 2a in that the content processing system 102' is used for web-based devices. Various devices may be web-based devices and include those illustrated in FIG. 1 as reference numerals 114-122. The web-based devices may be WiMax, WiFi, or otherwise wireless broadband-capable. Various types of content are provided by the content provider 104, are provided to the workflow system 220 in a similar manner to that illustrated in FIG. 2. In this embodiment, various license information, tier assignments and pricing availability are provided to the content management system 221 from the licensing/contracts 222 and ad sales 224. Various types of information that are entered into the content management system 221 may be referred to as business rules. The various business rules may be added manually or may be added automatically based upon various contracts with various contract dividers. The business rules may also include the pricing, the availability, and the type of target such as a set top box, a mobile device or a web device. Also, the availability, such as timing of the content, may be provided. The content management system 221 provides encoding commands such as the various types of targets, material identifications, and the like. The workflow management system 220 provides the content management system 221 collects various asset metadata including the file name, duration of the file, and the like.

The content management system 221 links the business rules with the content.

The content management system 221 provides the enterprise integration module 242 with billing data such as various pay-per-view numbers, publishing dates, and prices. This information may be provided to an on-demand web services 282.

The content management system 221 may also provide a content list or inventory to a web portal 284. Account information may be provided to the web portal 284 from the enterprise integration module 242. Inventory metadata may be provided from the web portal to the on-demand web service 282. A digital rights management (DRM) license server 286 may be used to provide content license information to the web portal 284. The web portal 284 may be used to provide inventory metadata to the DRM license server 286.

A digital rights management server 288 may receive content licenses from the digital rights management license server 286. The content management system 221 may provide digital rights management parameters to a digital rights management packager 290. The digital rights management packager 290 may provide an encrypted content file to the content repository 274 for storage therein. The content repository 274 may also receive clips, encoded content files and posters from the workflow management system 220. The file posters and other information may be associated with the various content files when stored within the content repository 274. It should be noted that the content files may be encrypted or non-encrypted and may also have the digital rights associated therewith. One suitable example for providing digital rights is using a Windows Media® management-type system.

The content management system 221 provides a distribute command to the content distribution system 260. The file location, publication dates, expiration dates, purge dates, and the like may be provided to the content distribution system. The content distribution system communicates upload commands to the content delivery network 280. In this embodiment, the content delivery network 280 may be a web-based network. As will be evident to those skilled in the art, various types of content delivery networks may be used for various types of content. In one aspect of the disclosure, one content delivery network may be provided for each different type of user device. For example, for distributing video to a cellular phone, a cellular phone content delivery network may be used. For a set top box, a set top box content delivery network may be used. Different rights and different encoding schemes may be used for the corresponding different user devices.

The content delivery network 280 provides content to the user devices 110 or 112. The user devices 110/112 may generate download commands by communicating with the web service 282. The web service 282 may communicate inventory metadata account information that is requested. For example, a content list of available content may be provided to the user devices 110/112.

The digital rights management server 288 may provide licenses that are requested by the system. The web portal 284 may grant pre-delivery licenses to the user device 110/112. Download commands from the web service 282 may be provided to the content delivery network 280 to initiate download of content from the content delivery network 280.

The web-based device may obtain the content list from the web portal 284 so that content available for downloading to the user device may be provided to the user device. Upon selection from the list, a particular piece of content may be provided to the user device. The enterprise integration module 242 generates a bill in response to the downloading of content from the system. The billing information is coordinated with the information from the content user so that the proper user is billed.

Figure 3:
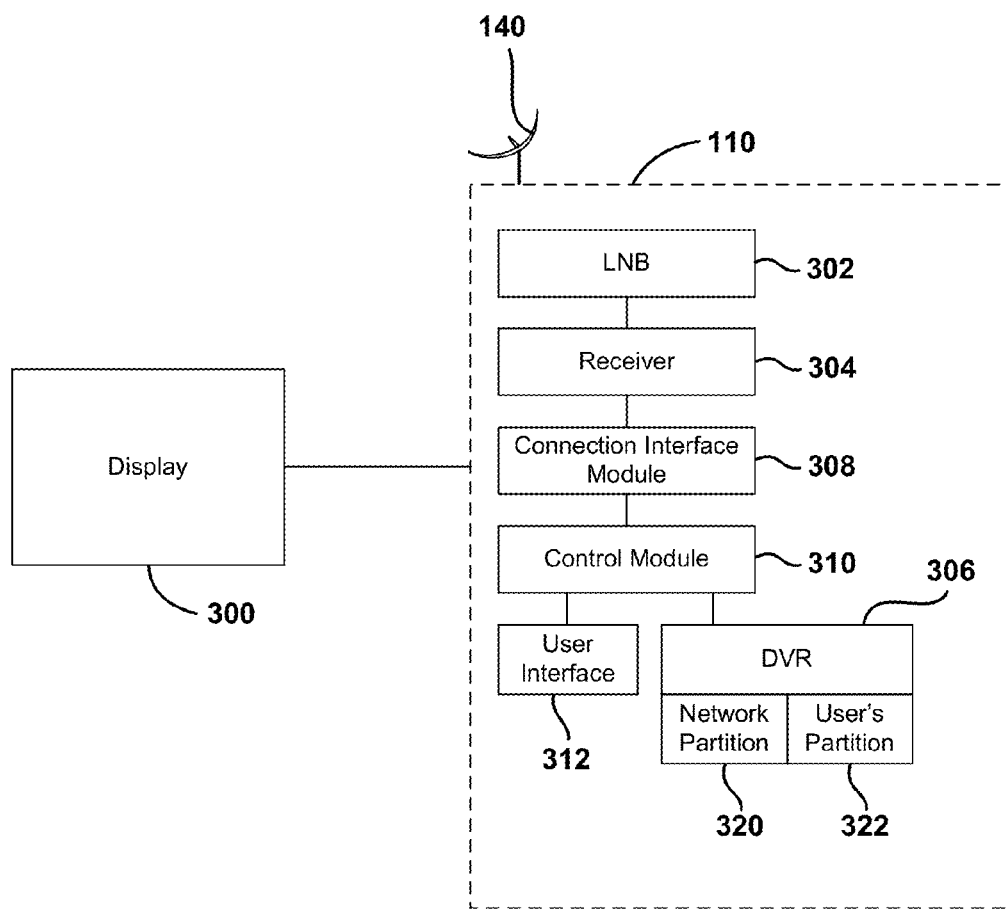
FIG. 3 is a detailed block diagrammatic view of the fixed user device of FIG. 1.

Referring now to FIG. 3, the user device 110 may be one of any variety of devices, for example, a set-top box, a home media server, a home media center (HMC), a personal computer (PC) having a receiver card installed therein, etc. A display device 300 such as a television set, a computer monitor, a portable media player or the like may be coupled to the user device 110. The user device 110 may be an integrated receiver decoder, a satellite television receiver or the like for displaying and/or playback of received programming.

The receive antenna 140 (124 on a mobile device) receives signals conveying a modulated multiplexed bitstream from the satellites 106, 108. Within the receive antenna 140, the signals are coupled from a reflector and feed to a low-noise block (LNB) 302, which amplifies and frequency downconverts the received signals. The LNB 302 output is then provided to a receiver 304, which receives, demodulates, depacketizes, demultiplexes, decrypts and decodes the received signal to provide audio and video signals to the display device 300 or a memory device 306, or both. Live television, recorded television clip and the like may be received through the receiver 304. The memory device 306 may be implemented separately from or within the user device 110. The receiver 304 is responsive to user inputs to, for example, tune to a particular program.

To store received and/or recorded programs and/or assets, the memory device 306 may include any of a variety of storage devices such as a hard disk drive, DVR, or other types of memory devices. The memory device 306 may be used to store the packetized assets and/or programs received via the satellites 106, 108 and/or the CDN 280. In particular, the packets stored on memory device 306 may be the same encoded and, optionally, encrypted packets created by the content processing system 102 and transmitted via the satellites 106, 108 and/or made available for download via the CDN 280.

The memory device 306 may also be a device capable of recording information on, for instance, analog media such as videotape or computer readable digital media such as a hard disk drive (HDD), a digital versatile disc (DVD), a compact disc (CD) and/or any other suitable media.

To communicate with any of a variety of clients, media players, etc., the illustrated example the user device 110 includes one or more connection interface modules 308 (e.g., USB, serial port, Firewire, etc.). The connection interface module 306 may act as a network interface that implements, for example, an Ethernet interface. Should a device be strictly web-based, the LNB 140 and antenna 140 may not be used. The connection interface module 308 may be used for receiving various types of content including, but not limited to, live video streams, clips and data.

Each user device 110 may connect to the communication network such as the Internet 122 via any of a variety of technologies, for instance, a voice-band and/or integrated services digital network (ISDN) modem connected to a conventional PSTN, a wireless broadband connection (e.g., IEEE 802.11b, 802.11g, etc.), a broadband wired connection (e.g., ADSL, cable modems, etc.), a wired Ethernet connection (e.g., local area network (LAN), wide area network (WAN), etc.), a leased transmission facility (e.g., a digital signal level circuit (a.k.a. a DSL), a fractional-DSL, etc.), etc.

The user device 110 may also include a control module 310 that is used to control the operation of the various components within the user device.

A user interface 312 may, for example, be a set of push buttons or a remote control interface. The user interface 312 is used to make selections, input various data, and change the parameters of the user device 110. The user interface 312 may be used together with a graphical user interface displayed on the display device associated with the user device.

It should also be noted that the user devices 110/112 may be configured in a similar manner to those illustrated in FIG. 3 through reference number 110. Such devices may include an internal antenna rather than an external dish-type antenna that is illustrated in the fixed device as 140. Also, external antennas are possible such as a phased array antenna.

The recording device 306 may also be partitioned into a network partition 320 and a user partition 322. Different types of content or assets may be stored in the network partition 320 or the user partition 322. The content stored in the different partitions may relate to the tier of the content. This will be further described below.

Figure 4:
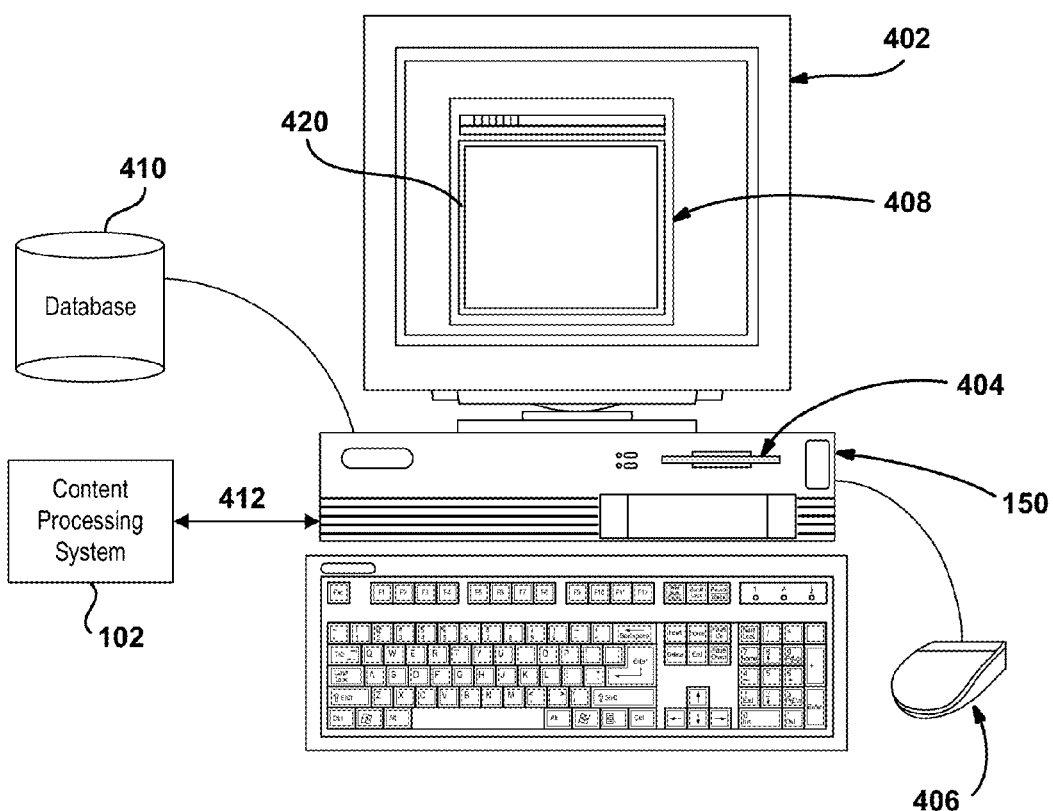
FIG. 4 is a block diagrammatic view of a computer displaying a user interface.

Referring now to FIG. 4, an exemplary hardware and software environment used to implement one or more embodiments of the invention is set forth. As illustrated, a computer 150 includes a display device 402 such as a monitor. The computer 150 may include a data storage device 404, a cursor control device 406, a database 410 and a network connection 412. Those skilled in the art will recognize that various combinations of the above components or any number of components, peripherals or other devices may be used with the computer 150. A program 408 that is used to generate a graphical user interface 420 is illustrated. The graphical user interface 420 may receive various types of video and data through the network connection 412. The program 408 includes logic or data embodied in or readable from a device, media, carrier or signal. The database 410 may be integrated within the computer or may be located across a network 412 on another computer or accessible device. The content processing system 102 may send portions of the data signals, video signals, or the like through the network 412. The data or content received by the computer 150 may be in such a format so as to be readable by the computer 150. The format of the content provided to the computer 150 may be a different format from that provided to a set top box.

Figure 5:
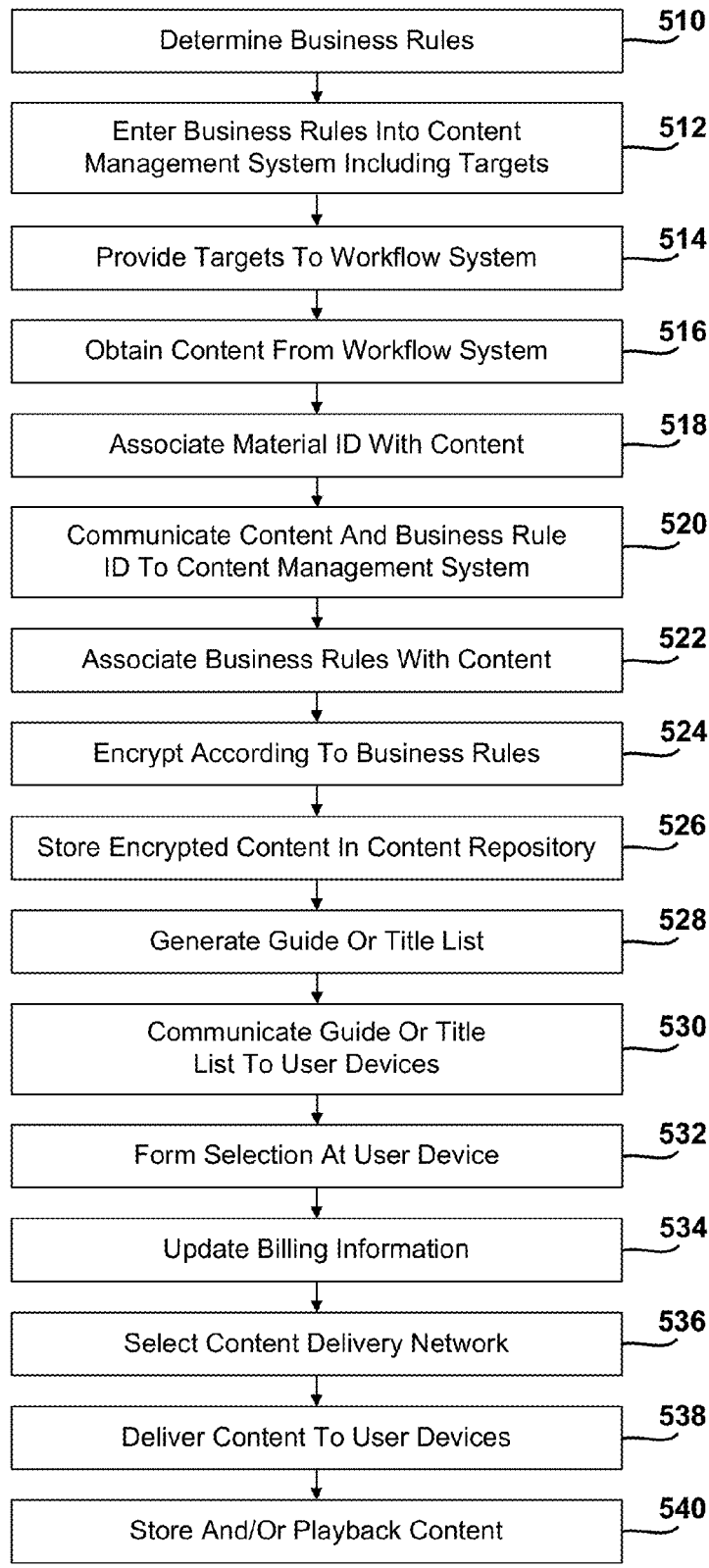
FIG. 5 is a flowchart of a method for delivering content to a user device.

Referring now to FIG. 5, a method for operating the present disclosure is illustrated. In this example, business rules and content are combined to provide a user selection list and ultimately deliver content to the users. In step 510, business rules are determined. The business rules may be determined and entered into the content management system 221 of FIG. 2a or 2b. The business rules may include various characteristics including the dollar amount, the various targets such as which user devices are to receive the content (subscribers), and various other profiles. In step 512, the business rules are entered into the content management system and include the targets. The business rules may be entered by an operator in response to various distribution agreements. In step 514, the targets are provided to the workflow system. In step 516, content that is obtained by the workflow system is provided to the content management system 221. The workflow system provides the content with material IDs that are used for further identification once it is received by the content management system. Each content has a material ID associated therewith. In step 518, the material ID is associated with the content.

In step 520, the content and business rule ID is provided to the content management system. In step 522, the business rules are associated with the content in the content management system. In step 524, the content is encrypted according to the business rules. Encryption may take place at the digital rights management packager in FIG. 2b or the encryption module 272 illustrated in FIG. 2a. Encryption may take place according to the business rules. More specifically, the content may be encrypted depending on the end user device or target for which the content is destined. Various types of encryption may be provided to various contents for use in the various systems. That is, when stored in the content repository, several different versions of the content encrypted in different ways may be stored therein. In step 526, the encrypted content is stored in the content repository.

In step 528, a guide or title list is generated. The guide or title list may also be referred to as an inventory list. The inventory or title list is generated in response to the content available in the content repository. Preferably, elements of the list are only provided for content available for the different types of targets or devices. That is, when the content list is received by the various devices, only the content that is available to that device is preferably received. The elements of the list may be compiled by the content management system 221. In step 530, the guide, title list or inventory is communicated to the user devices. The title list may be provided to the user devices in various ways including through a satellite, through a terrestrial system, through a terrestrial wireless system, through a web-based system, or the like. The content list may be provided in a different way or using a different communication means than the content is provided. For example, a list may be provided through the satellite, whereas the content may be received through a broadband or Internet-based system. Communication to the user devices may also take place on a web-based system. The user devices may be used to obtain information on a website that is in communication with the user device.

In step 532, a selection is formed at the user device. The selection may be performed by entering or selecting the content from a user interface at the user device. A graphical user interface may have a selection box thereon for selecting. The selection box may be moved using cursors or other devices. Specialized selection buttons or buttons that exist on a system may be used for forming a selection. A signal identifying the selection is formed and communicated to the content processing system. In step 534, once a selection is selection, billing information is updated so the proper user device account may be updated. In step 536, the content delivery network is selected. The content delivery network may be selected depending on the type of content selected. That is, various content delivery networks may be provided in a particular system. However, only one of the content delivery networks may be used for delivering content to that particular user device based upon the formatting and the like.

In step 440, the content is played back or stored in the user device. It should be noted that the playback may be performed while recording the content.

Figure 6:
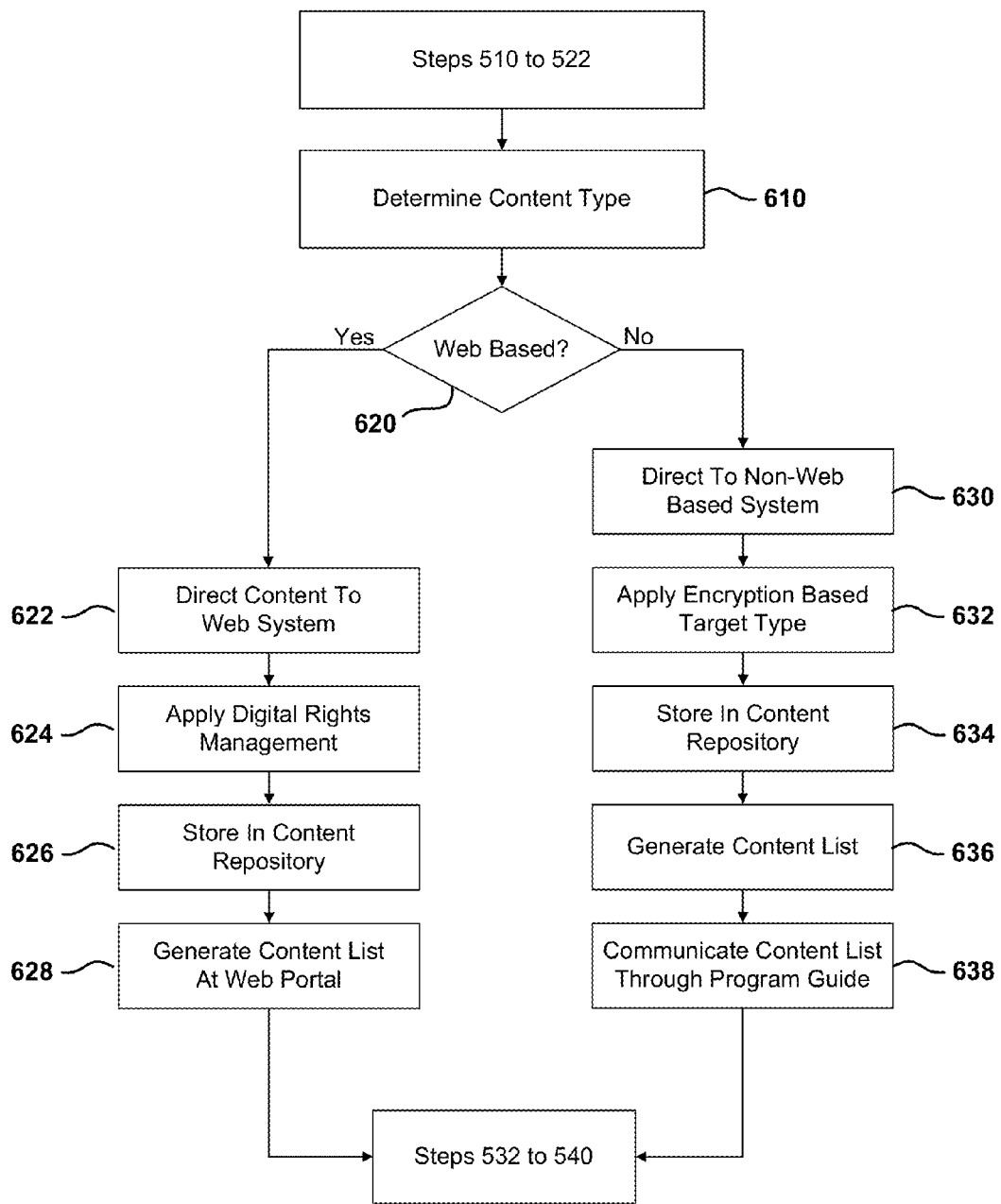
FIG. 6 is a flowchart of a method for delivering web-based or non-web-based content to user devices.

Referring now to FIG. 6, a specific method for operating the content management system is illustrated. Steps 510-522 of FIG. 5 are shared in this embodiment. In step 610, the content type is determined. The content type is based upon the target described above. The target corresponds to the various types of user devices. In this example, a web-based and non-web-based-type system is employed. However, the same decision blocks may be used for various other types of target devices. It should also be noted that more than two different types of targets may be provided. However, in such a system, the same types of logic may be used. In step 620, the system determines whether or not the content is destined for a web-based system. In step 622, if content is for a web-based system, the block diagram of FIG. 2b may be utilized. In step 624, digital rights management (DRM) may be applied. Digital rights management may be windows media-based digital rights management or various other types of digital rights management. The digital rights management may also include various types of encryption. In step 626, the content with the applied digital rights management and/or encryption is stored in the content repository. In step 628, a list is provided for the content available at a web portal. After step 628, steps 632-540 of FIG. 7 may be performed.

Referring back to step 620, if the system is not a web-based system, step 630 may be performed. In step 630, the schematic of FIG. 2a may be used to process the content. In step 632, encryption is applied to the content based on the target type.

In step 634, the content, with the applied encryption, is stored in the content repository. In step 636, a content list is generated for the particular target. In step 638, the content list may be communicated through the program guide or other means. For a satellite-based system, the program guide may be communicated through the satellite. The content list available from the content delivery network may be periodically updated and communicated through the satellite.

After step 638, steps 532-540 of FIG. 5 may be performed.

When the content is provided to the various content delivery networks, various life cycles, purge times, and the like may be associated with the content. The content may have different life cycles, purge times, and other characteristics when provided to each content delivery network. It should also be noted that the same content may be provided through different content delivery networks with different timing characteristics. The different content delivery network may have the same or different types of encryption as well. The various purge times and other life-cycle components are provided in the metadata as described above. Highlight clips, for example, may only be available for a few days after the event or until the next event.

The example in FIG. 6 is provided for web and non-web-based system. The examples may easily be extended to other types and numbers of systems and targets.

A graphical user interface 710 that may be displayed on a user device is set forth. The graphical user interface may be reached through the web interface 244 of FIG. 2a, which in this case is DIRECTV.com. The graphical user interface may be located on various websites throughout the Internet. To provide the benefits of the system, a user login may be provided. A login interface 712 may include a user name box 714 and a password box 716. Both the user name, such as an email or other account identifier, and a password may be entered using a keyboard or other device. If a user is unregistered, a registered selector 716 may allow a user to register for the service. Should this service require a particular program, or the like, a download selector 718 may be used to down load the particular program required for the service. Once the user name and password are provided, a sign-in selector 720 may be selected by the user. A cursor may be moved around by way of the cursor control device such as a mouse. Clicking with a mouse may be used to move the cursor around or select the selector areas. Both the password and user names may be checked against the database of valid customers before allowing access to the particular program. Various levels of access may be provided depending on the specific features or packages subscribed to by a user. For example, some features may not be accessible while other features may be accessible. Other areas 730, 740 may comprise advertising space for various other features provided through the system. Also, the ads advertising areas 730, 740 may be used to provide advertisements for goods and services provided by others.

The present disclosure may be used for various types of systems. The logon screen may be optional and provide data to a complete set or limited set of data. If only a partial data set is provided, a more complete data set may be provided after a login.

Figure 7:
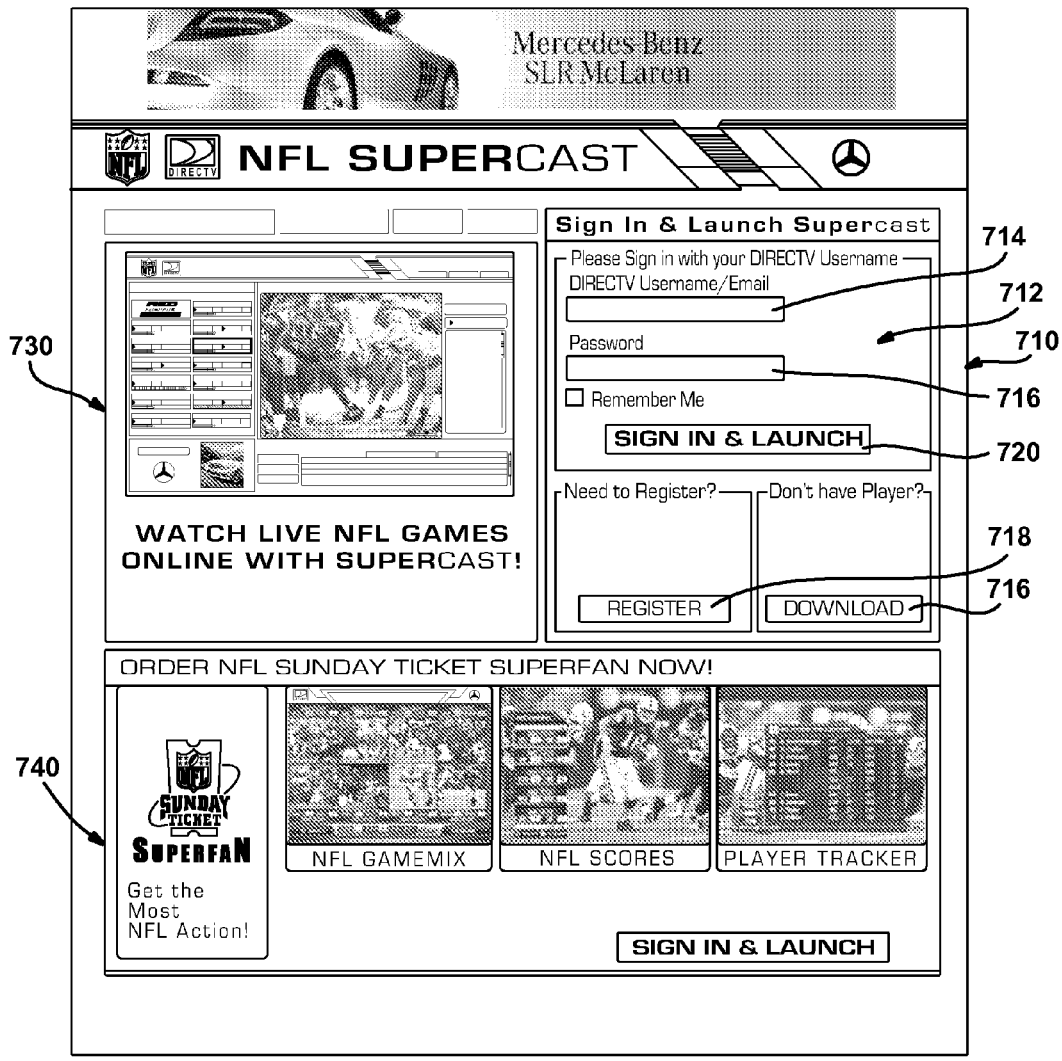
FIG. 7 is a screen display of a user interface for logging into a system.
Figure 8:
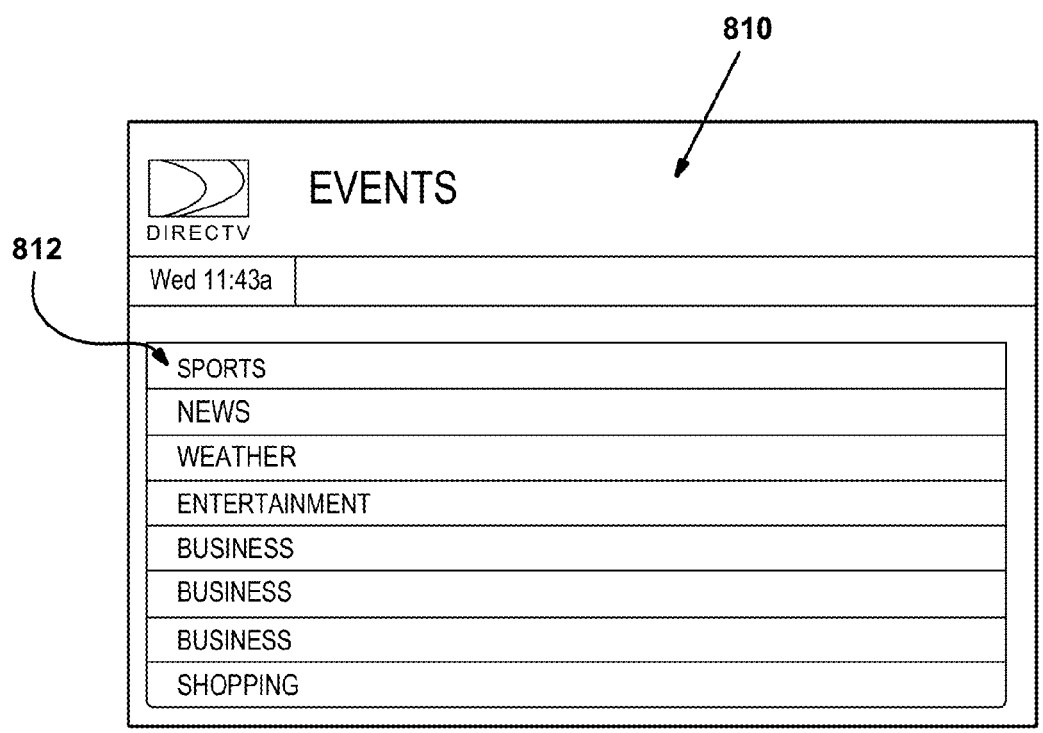
FIG. 8 is a screen display of a user interface for selecting various events.

Referring now to FIG. 8, a user interface 810 is illustrated. User interface 810 may appear after a login through the interface provided in FIG. 7. In this interface, access to various categories of events may be provided. A list of events 812 is set forth on the user interface 810. Each of the members of the list may act as a link to link to various lists of content. Each of the links within the list 812 may be selected by clicking with a cursor or moving a box. It should be noted that the user interface 810 may be provided on a display associated with a set top box or on a display such as a monitor associated with a computer.

Each of the links or list items in the list 812 may direct the user to another user interface whereby more information for the specific category may be provided. Examples of categories illustrated within the user interface 810 include a sports link, a news link, a weather link, an entertainment link, a business link, and a shopping link. These categories are provided by way of example and should not be considered limited.

Figure 9:
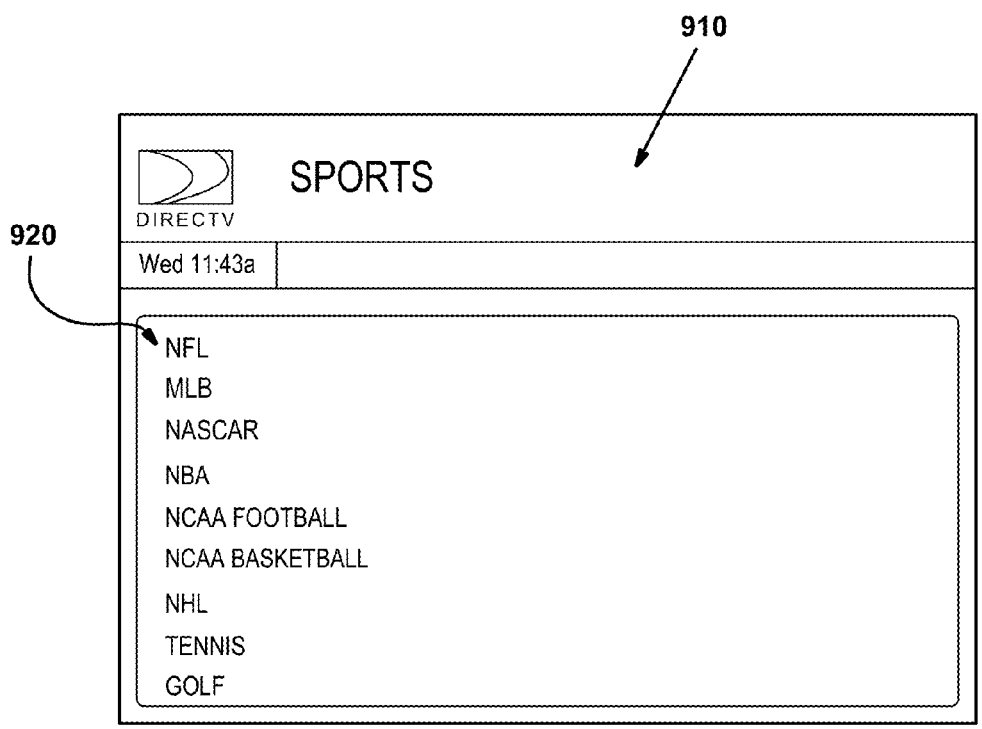
FIG. 9 is a screen display of a user interface for various sporting events.

Referring now to FIG. 9, a user interface 910 directed to from a user interface 810 by clicking on the sports link is set forth. Of course, should sports be the entire package, the sports user interface 910 may be provided directly after a login. A sports list 920 is provided with various links to various different sporting events. Each word may be a link to another page. In this list, the National Football League (NFL), Major League Baseball (MLB), NASCAR, National Basketball Association (NBA), NCAA Football, NCAA Basketball, National Hockey League (NHL), tennis and golf each provide links to specific information regarding those sports leagues. Of course, various other types of information, such as advertising, and links to other services may be provided within the user interface 910.

Figure 10:
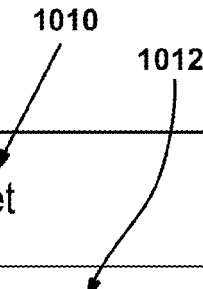
FIG. 10 is a screen display of a user interface for National Football League scores.

Referring now to FIG. 10, an example of selecting a link, such as the NFL link, from the user interface 910 in FIG. 9 is set forth. The data provided by selecting the NFL link has various team names and the status of the game. The score and the time period within each quarter are set forth. Each of the groups of scores may correspond to a record function. That is, by selecting or clicking on a selectable area such as one of the scores, team names, or times for the games, a record function may take place. The record function may enable the set top box to record the content selected. If the user interface is accessed by computer through a website, a process for initiating recording for a remote user device may be initiated. The user interface 1010 includes a plurality of list items 1012.

Figure 11:
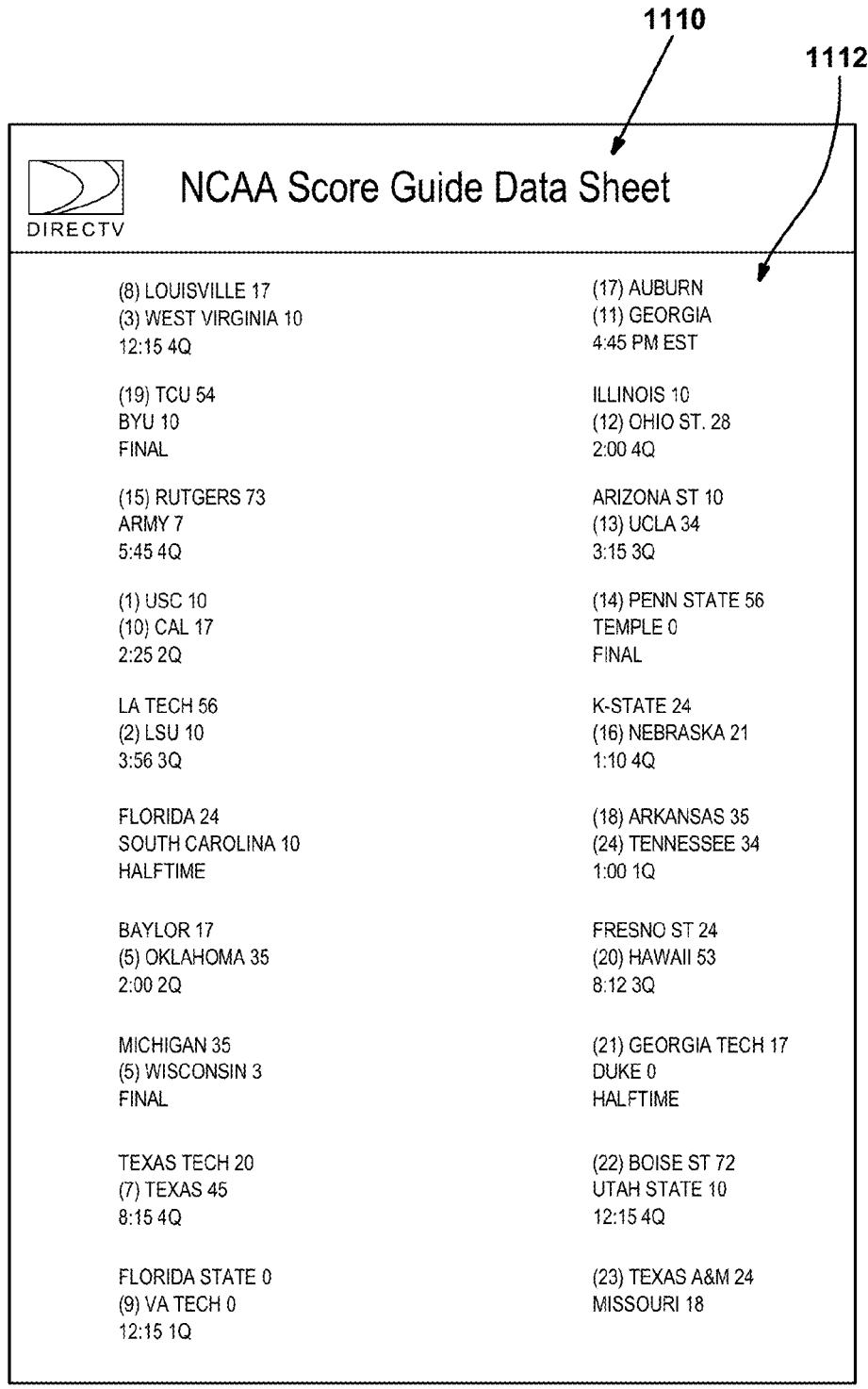
FIG. 11 is a screen display of a user interface for college (NCAA) football scores.

Referring now to FIG. 11, a user interface 1110 having a plurality of scores selected by selecting the NCAA link of FIG. 9 is illustrated. In this example, by selecting one of the list members 1112, a record function may take place.

Figure 12:
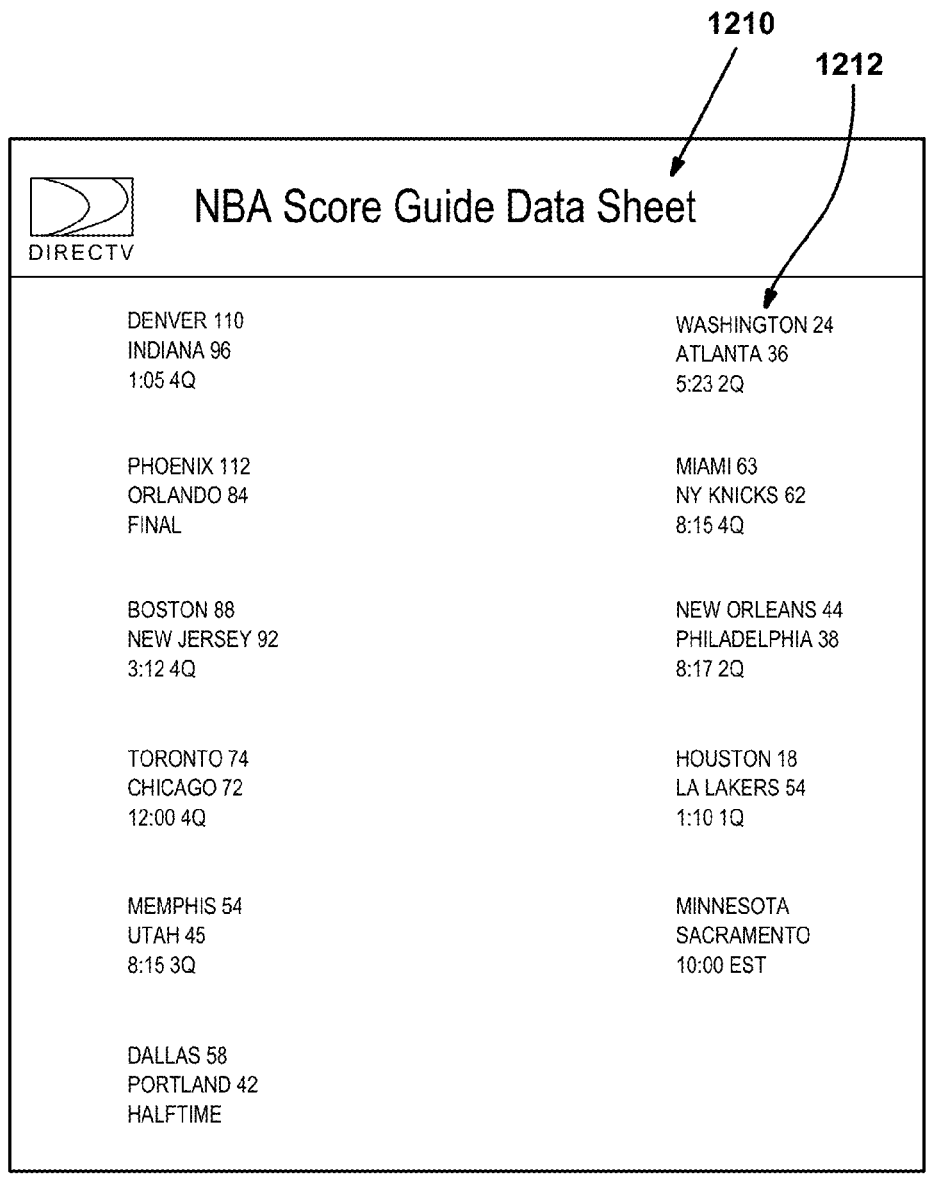
FIG. 12 is a screen display of a user interface for National Basketball Association scores.

Referring now to FIG. 12, a user interface 1210 having list 1212 of various NBA games reached by selecting the NBA link of FIG. 9 is set forth. Again, each of the members of the score list may provide a method for providing a quick record to a receiving device.

Figure 13:
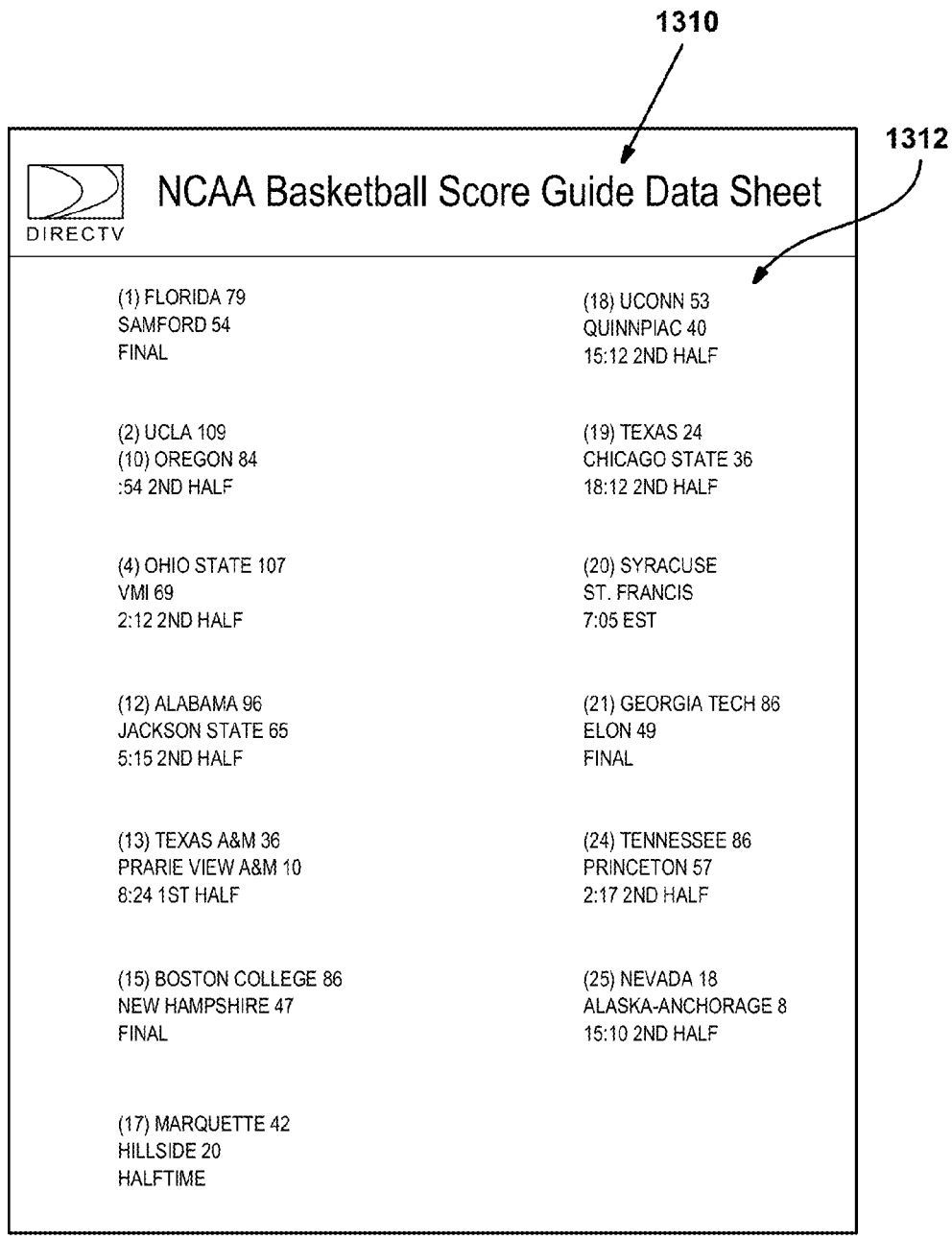
FIG. 13 is a screen display of a user identifier for college basketball scores.

Referring now to FIG. 13, an NCAA basketball user interface 1310 may be reached from selecting the NCAA basketball link of FIG. 9. A list 1312 having a plurality of team scores for basketball may be set forth. A ranking may appear before a team if the team is nationally ranked. The score, the team name, the time and the period may all be set forth for each game.

Figure 14:
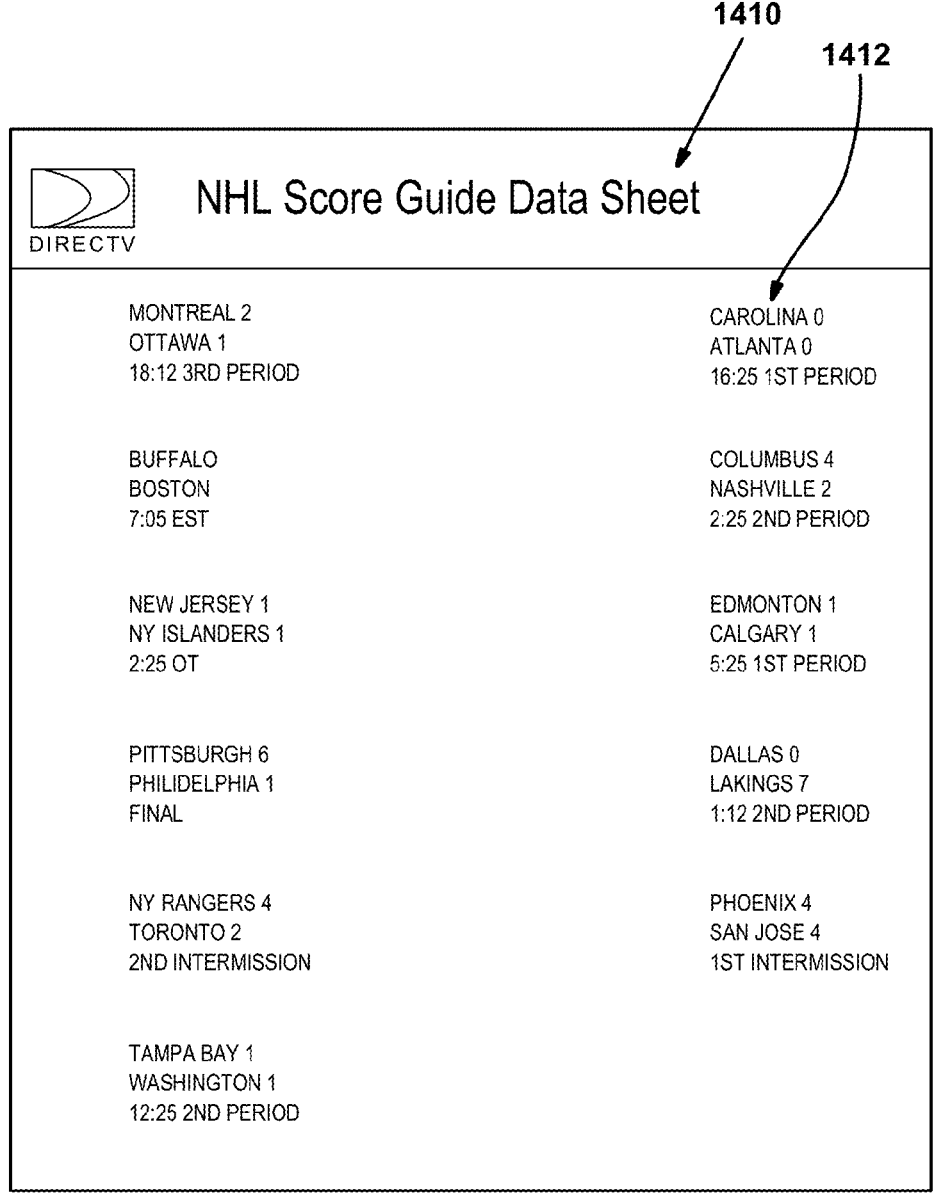
FIG. 14 is a screen display of a user interface for displaying National Hockey League scores.

Referring now to FIG. 14, by selecting the NHL link in FIG. 9, an NHL user interface 1410 may be provided. A user interface may include team names, a score, a period number and a period time within a list 1412. Again, by selecting one of the team scores, a record function may be provided at a receiving device.

Figure 15:
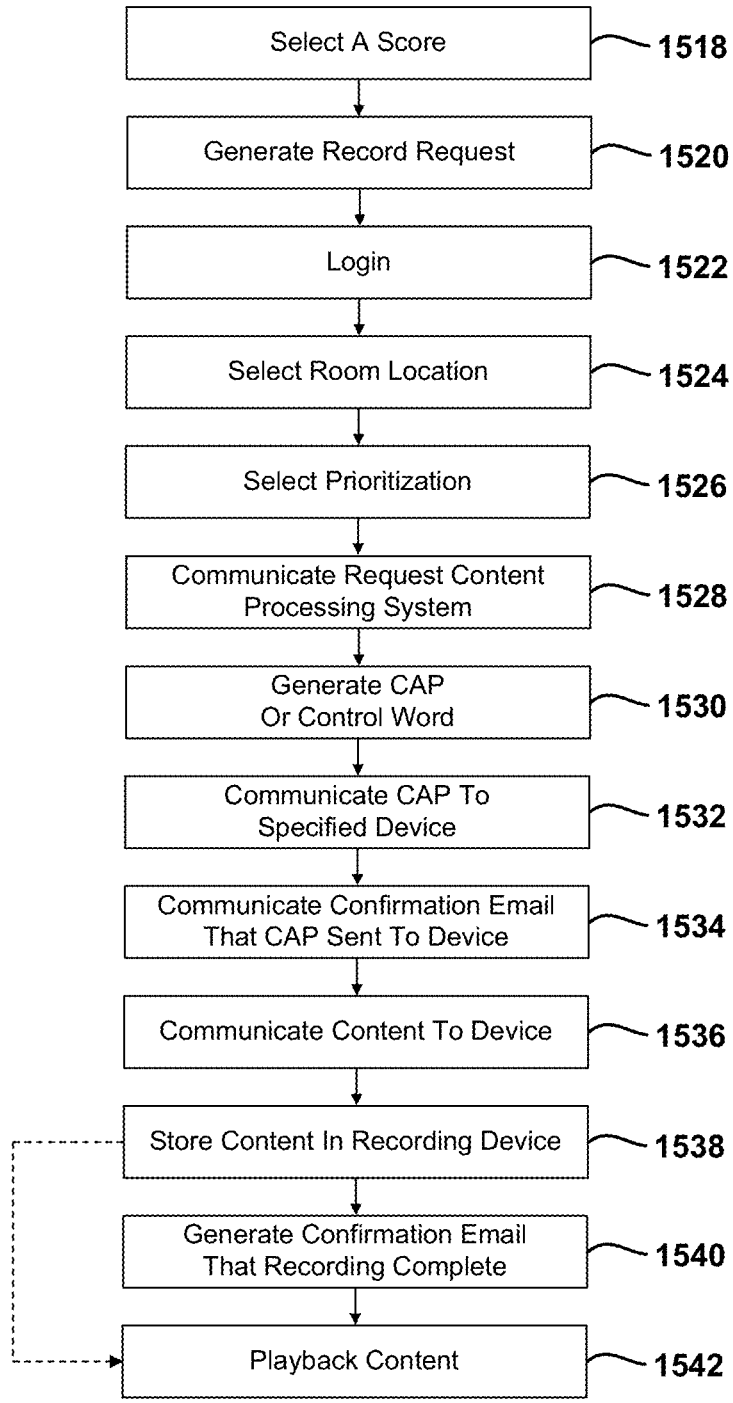
FIG. 15 is a flowchart of a method for recording content on a user device.

Referring now to FIG. 15, a method is illustrated for following a link in a user interface is set forth. In step 1518, the link may be a link in a score guide application on a website or on a display of a set top box or other user device. Each score may represent a link. A confirmation of the request to record may be formed after selecting a score such as "Confirm Record Request". A "RECORD TO RECEIVER" selection may be selected in step 1520. This process may be entered by first logging in or by selecting the "RECORD TO RECEIVER" function, then logging in. Logging in is illustrated in step 1522. This may be an optional step if the user is already logged in as described above or the system is on a display associated with a set top box or user device.

Other parameters may also be selected when choosing to record a request. In step 1524, a room location or access card corresponding to a room location may be set forth.

A prioritization may also take place when choosing the recording function in step 1526. Prioritization may take place by adding a title to the queue or adding to the top of the queue for immediate downloading. Once a confirmation of the selection has taken place, the content may be communicated to and stored within a recording device. In step 1528, a request for recording is communicated to the content processing system.

In step 1530, a conditional access packet or control word is generated in response to the request signal. The request may be provided from the web interface 224 through the enterprise integration module 242 through the conditional access transaction system 238 all of FIG. 2. The CAP or control word may include various information such as the particular content delivery network or the particular transponder on the satellite that will correspond to the content. Content time, duration channel, location may be information provided in the CAP. In step 1532, the CAP is communicated to the specified device through the satellite. The CAP may also be communicated through a broadband network to the specified device. The specified device may be a set top box suitable for receiving both broadband communications and satellite communications.

In step 1534, a confirmation e-mail may be sent to the e-mail associated with the account that a CAP was successfully sent to the device. The e-mail step is, of course, an optional step. The e-mail is generated in the content processing system through a web interface such as DIRECTV.com.

In step 1536, the content is communicated to the device in response to the CAP or control word. The CAP may contain information as to the specific content delivery network 280 of FIG. 2a that includes the content. The CAP may instruct the set top box to retrieve the content from the content delivery device. If the content is communicated by way of satellite, the CAP will tune the set top box to receive communications from a particular transponder of a particular satellite within the satellite system.

In step 1538, the content is stored in the recording device within the set top box. The recording device, as mentioned above, may be a digital video recorder (DVR). In step 1540, once the entire content is communicated to the set top box and stored in the recording device, an e-mail may be generated that describes that the recording has been completed in step 1540. In step 1542, playing back the content may then be performed. It should also be noted that after step 1538, step 1542 may be completed without the performing step 1540.

Step 1540 may generate the e-mail in various manners. For example, the set top box itself may generate an e-mail through a broadband connection and communicate the e-mail or direct the e-mail to the e-mail associated with the account. The e-mail may also be communicated or initiated at the content delivery network. A "successful" or confirmation signal may be generated at the set top box when a broadband content is delivered successfully. The confirmation signal may be used by the content delivery network and to communicate the signal to the content distribution system and that through the billing system or the like. The content processing system may then generate an e-mail to the specified e-mail of the account.

Figure 16A:
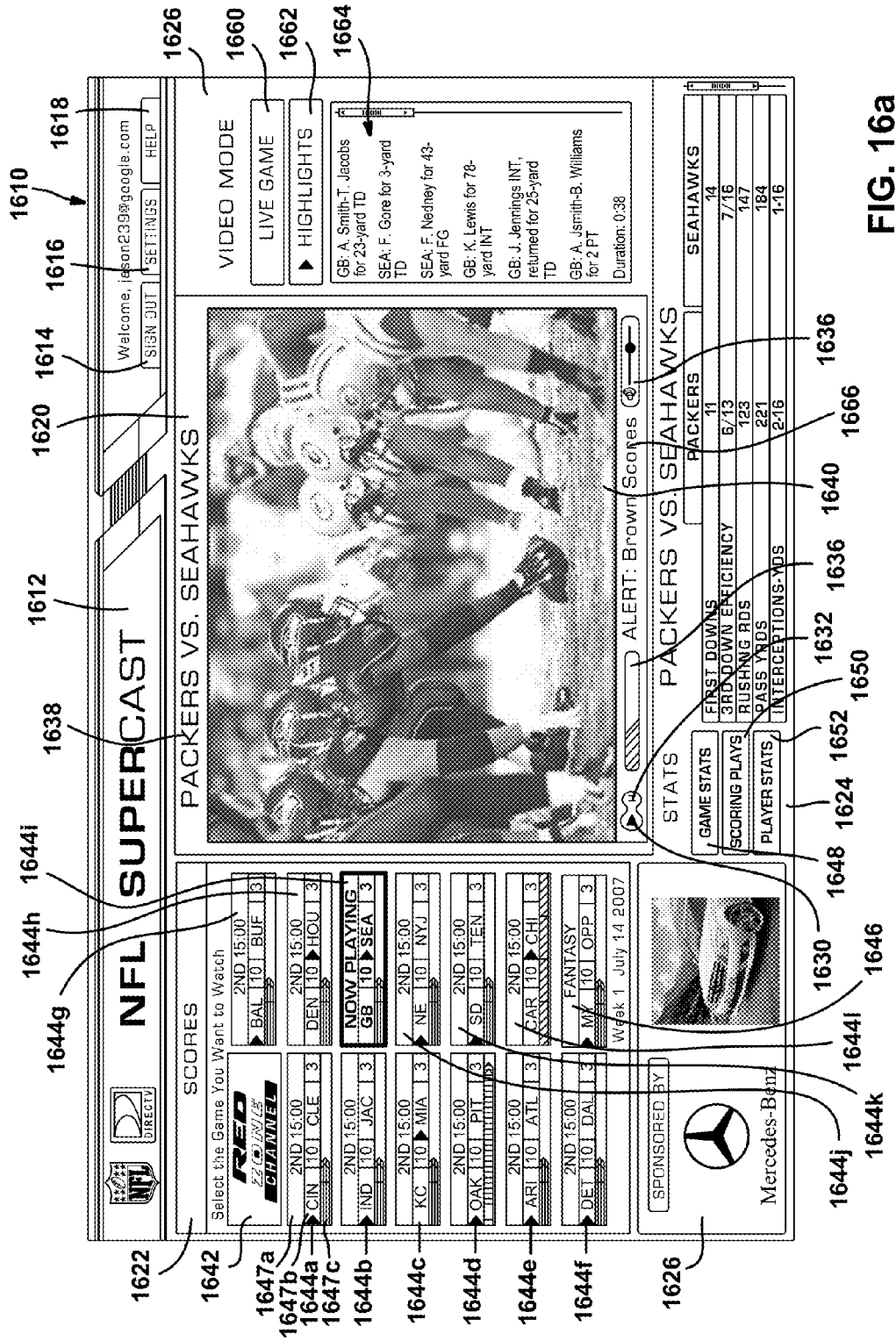
FIG. 16A is a screen display of a user interface for accessing data and video.

Referring now to FIG. 16A, a first example of a user interface 1610 displayed on a display is illustrated. The user interface may be provided for either a website or through a set top box. The user interface 1610 may be reached in many ways including through selecting the "NFL" link in user interface 910, or directly after entering the user email or password for the service as illustrated in FIG. 7.

The user interface 1610 may include a header 1612 that provides various logos, the name of the service, or other functions. Various tabs may also be provided for general functions. For example, a sign-out tab 1614 may be provided for logging out or signing out of the system. A settings tab 1616 may be provided for setting the quality of the video, picking players for fantasy teams, team settings, or the like. A help tab 1618 may also be provided to the user for providing the user with help for various technical functions. Each of the tabs 1614-1618 may generate a pop-up window or other area on the user interface that may change to convey the various information or provide the function.

The user interface 1612 includes a video display area 1620, a first information area such as a score area 1622, a second information area such as a statistics area 1624 and a third information area such as a highlights area 1626. An advertising area 1626 may also be provided. The present disclosure may be provided for certain sporting events. However, other types of events may be provided. When the events have not yet started or the events have concluded, some or all of the information may not be provided. For example, no video will be displayed in the video display. The service may only be available during certain time periods. For example, an NFL-type package may only be available during Sunday afternoons until the conclusion of the last game. Appropriate messages may be displayed to inform the user that the program may be available for viewing at a later time or that the video has concluded.

The video display area 1620 may include video at different types of resolutions. The settings tabs 1616 may be used for switching between various settings. Various types of video resolution may take place and, in a web-based service, may vary depending on the bandwidth of the system. The video display may have user control such as a play bar 1630, a pause button 1632, a status bar 1634 and a volume bar 1636. A title of the particular event, such as a sporting event, may also be displayed. In this case, the Packers vs. the Seahawks is the title of the sporting event. The sporting event title may be provided at 1638. As will be described below, the video may be a streaming video that is real time or near real time or may be clips of highlights taken from various games. The screen portion 1640 is used for displaying the video of the system. The video displayed in the video display area may be related to one of the chips in the score area.

The score area 1622 may include a plurality of chips 1642, 1644A-1644l, and 1646. The boxes 1642-1646 may be referred to as chips. The chips may have different or similar functions and take up a selectable area within the user interface. Chip 1642 is labeled "a Red Zone Channel" chip. By selecting the Red Zone Channel chip, the video displayed in the video area 1637 may be changed. By selecting the Red Zone Channel chip 1642, the Red Zone Channel may be displayed in the video display 1620. The Red Zone Channel may be a compilation of key scoring plays that are broadcast live. The Red Zone Channel may be a live scoring play channel feed. The Red Zone Channel switches from game to game or sporting event to sporting event based on a potential likelihood for scoring for a particular game. While selecting the Red Zone Channel chip 1642, the statistics area may also be changed to display "Today's Best." "Today's Best" may provide the viewer with the best player statistics for the games of the current day. The Today's Best statistics area displayed in the statistics area 1642 may be updated regularly, such as every minute during live broadcast.

The video displayed in the video display area may be related to one of the chips in the score area. That is, they may be from the same event. When selecting a chip, a "now playing" graphic may be displayed in place of the chip around the chip or a portion of the chip. Within the statistics portion, the best running, passing and receiving sections may be provided. For example, the best running plays may be provided by selecting a running play selector. The best passing plays may be provided by selecting the pass play selector, and a receiving play selector may be used to display the best receiving plays of the day. The today's best portion, when displayed under the statistics, will provide cross-team statistics for various players. As will be described below, a drop-down game menu may also be provided and today's best may be selected without selecting the Red Zone Channel chip 1642. When selecting the Red Zone Channel chip, the color around the video display 1620 may also change to a color such as red.

In the highlights column 1626, highlights may be displayed from the oldest to the newest (in reverse chronological order). The most recent highlights from all games may be provided when the Red Zone Channel is selected. This will be described further below. The other chip 1644A-1644L may be referred to as game chips. Each of the game chips 1644 may correspond to a particular game or channel feed for the particular day. Each chip may be selected by using the cursor control device to point, click or roll over the given chip. When rolling over a chip, various choices may be displayed, such as watch now, view highlights, or "blacked out" if the video has been blacked out for contractual reasons. The cursor control device may be used to perform one of the selections when rolling over the selectable area of a chip.

The chips for various sports may provide different information. As illustrated in this example, the chips 1644 have three levels. The top row or level 1647a indicates the scoring period for the game. Chip 1644A, for example, is in the second quarter since this is a football game. A game clock may also be displayed in the top level. In the second or middle row 1647b, various other information may be provided such as the team names and the score of each team adjacent to the team names. A possession indicator indicating the possession of the ball is also provided as a triangle in the second row. In a third row 1647b, underneath the scores, a yardage position indicator may also be displayed. The yardage position indicator may have a line corresponding to whether the ball is in front of or behind the line of scrimmage and may also have a color to indicate the overall field position. For example, when a football team reaches the 20 yard line, a red indicator will be provided. When a scoring event occurs, the indicator may turn green for a specific duration such as 40 seconds. When a field goal is kicked, the position indicator may urn green. When a change of possession takes place, the field position arrow may be blanked out for a particular time period then refreshed. The chip may also display "final" in the top line when the final score of the game is reached. Other indicators, such as "halftime" or "final OT" indicating the final score in overtime may also be provided. Selection of one of the chips 1644A-1644l may change the video section to display live video for that game. As is indicated in the figure, chip 1644i has been selected. It is shown with a bolded box. Colors may also be used to indicate the selected game.

By selecting a chip, the highlight area 1626 may display the last five highlights or any pre-determined number of highlights for the particular game selected. The statistics area 1624 may also provide statistics for the particular game selected by chip.

A fantasy chip 1646 may also be provided. The fantasy chip 1646 may provide a score or point value for a fantasy team. Both the user's team and an opponent's team may be selected. This may be performed through the settings tab 1616. Arbitrary point values, as will be described below, may be provided in the fantasy section. By selecting the fantasy chip 1646, the highlights portion may generate the last several highlights corresponding to either the my team or opponent team fantasy player selections. The statistics area 1624 may also correspond to the fantasy player's statistics.

The statistics area 1624 may provide various types of statistics. In this display 1624, a game statistics illustrating various statistics for each team may be provided side-by-side. A game statistic selector 1648 may be provided in the game statistics area for switching between different types of statistics. A scoring play selector 1650 may also be provided for generating or displaying various scoring plays. A player statistic selector 1652 may be used to select various player statistics for the teams displayed. As mentioned above, the statistics area 1624 may be controlled by selecting a chip or by selecting a pull-down menu as will be further described below in another embodiment of the disclosure. Different events may display different statistics.

The highlight area 1626 may include a live game selector 1660 and a highlight selector 1662. By selecting the live game selector 1660 or the highlight selector 1662, the video mode of the video area 1638 may be changed. By selecting the highlight selector 1662, highlight links 1664, highlights of plays of the current game may be selected. By selecting one of the highlights 1664, a link to a highlight clip is activated. Each link 1664 may comprise a short summary, including a team name, player's names, and a summary of a play. For example, the first link is by the Green Bay team for a 23-yard touchdown with players Smith and Jacobs. Scoring plays and other key plays may be set forth in the link 1664. For football, various types of events may be highlighted, such as touchdowns, two-point conversions, field goals, turnover fumbles, turnover interceptions, unusual plays, long plays, long kickoff returns, long put returns, on-sight kick recoveries, safeties, blocked field goals, blocked punts, or unusual events such as fights, injuries or big hits. Of course, other scores may have different types of highlighted events.

Figure 18:
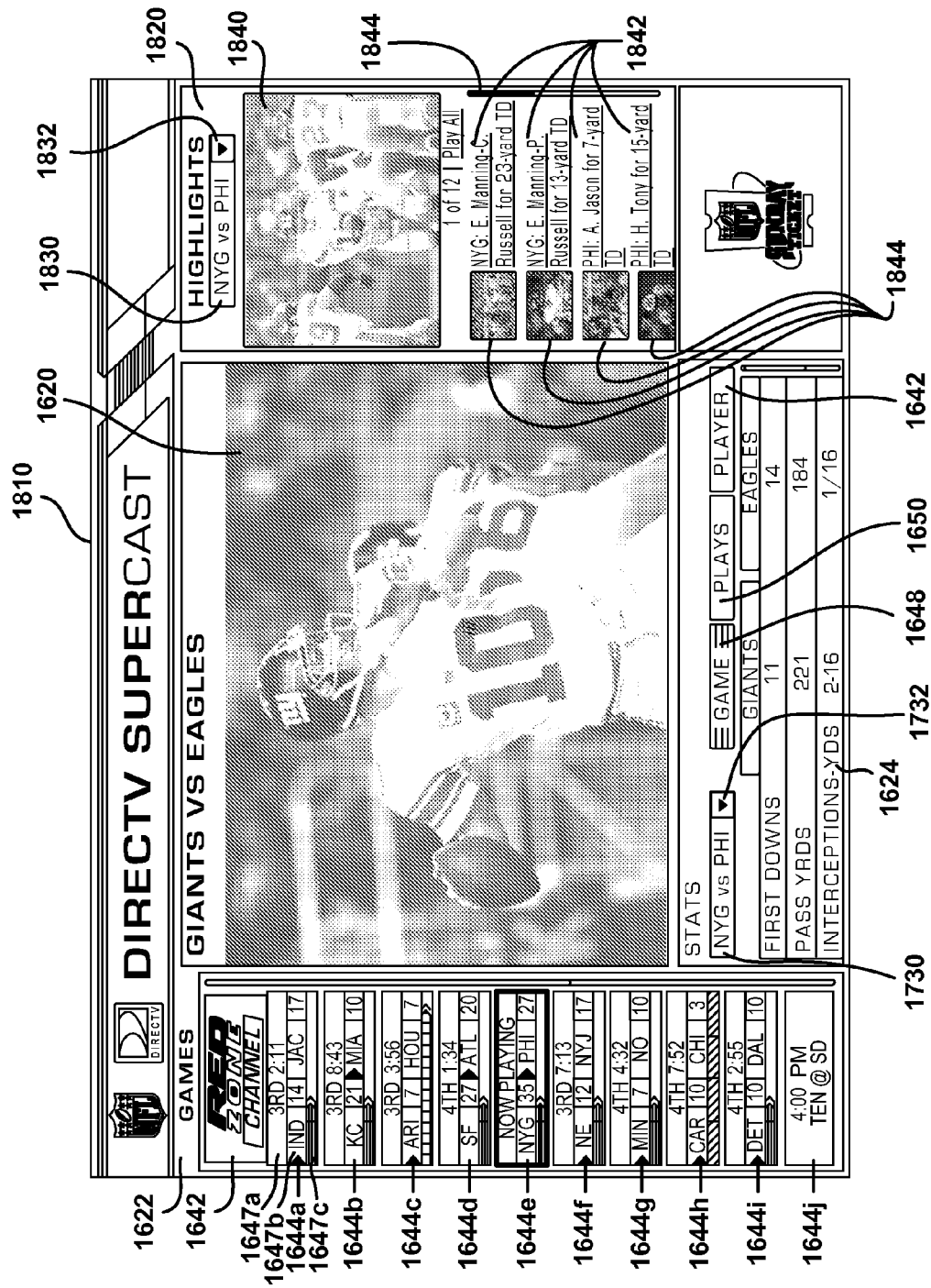
FIG. 18 is a screen display of a third embodiment of a user interface.

A textual alert 1666 may be generated within the user interface at various locations. As illustrated, the alert is in the video display area 1620. The alert 1666 may also be located superimposed on the video or in a separate box. The alerts may be set in the settings tab 1610. Alerts may be set for various events, teams, players, fantasy players and the like. The alert may be accompanied by an audible signal. By selecting the alert 1666 with a cursor, the highlight may be played in one of the video display areas of the user interface. (A second video display area is illustrated in FIG. 18.)

In FIG. 16B, a player picker user interface 1670 is illustrated having a list 1672 of players and check boxes 167 for selecting players. The user interface 1670 may be sorted in various ways including by team, alphabetically or by rank as illustrated. Once selections are made, the names, codes or other typed of identifiers associated with the names may be communicated to the content delivery network. The player picker user interface may be provided on a website or through the user device such as the set top box.

Figure 17:
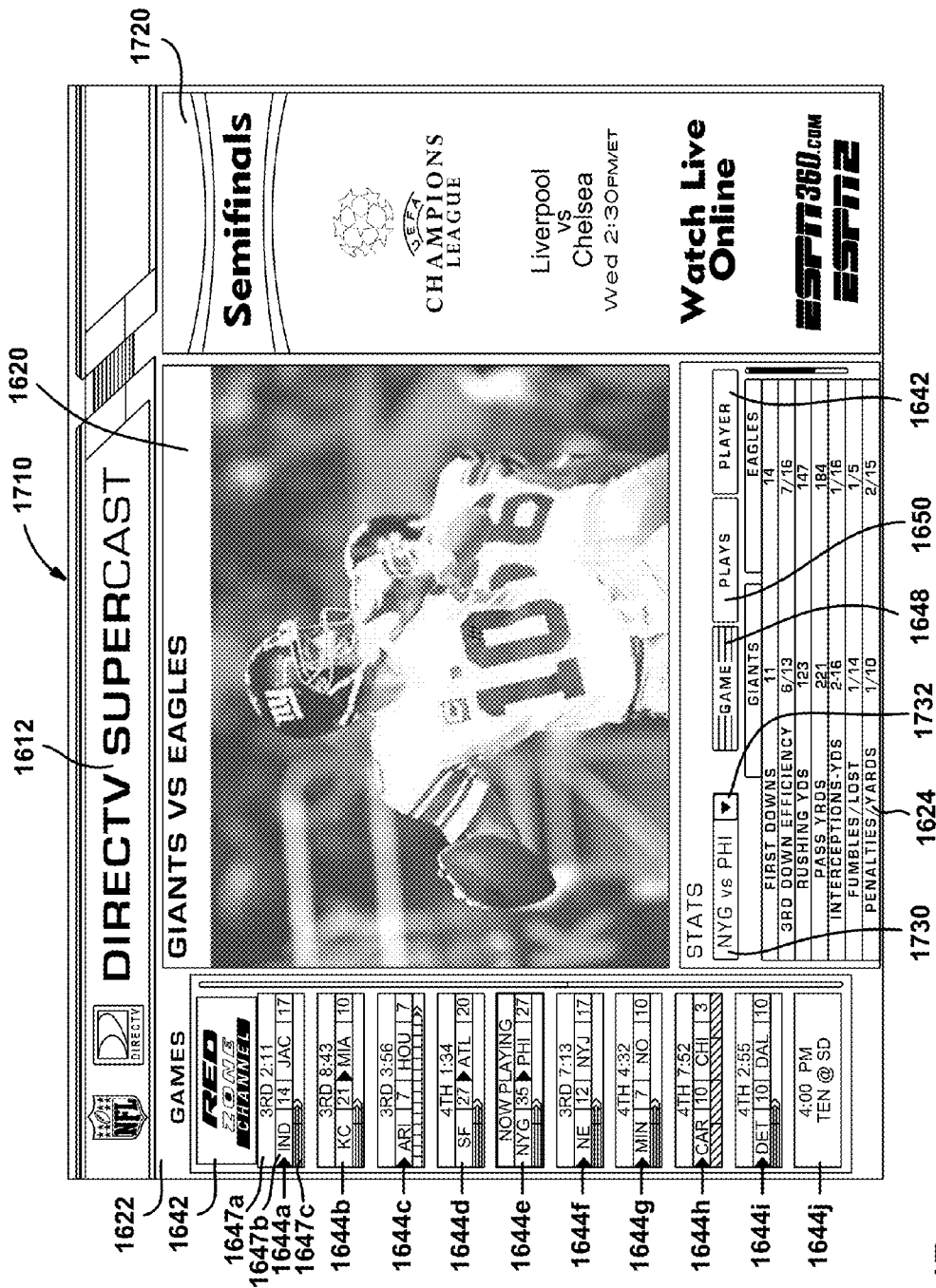
FIG. 17 is a second embodiment of a user interface for accessing video and data.

Referring now to FIG. 17, a user interface 1710 is illustrated. Many features are similar to those illustrated in FIG. 16 and will not be described again. The score section 1622 in this embodiment includes a single column of game chips 1642 and 1644A-1644J. The function of the chips 1644A-J is the same. The last chip 1644J cannot activate the video since the game has not yet started. A game time is illustrated in the chip 1644J. In this embodiment, the highlight area 1626 has been replaced by an advertising area 1720. This may be a temporary ad so that highlight area 1626 may eventually be displayed or the advertising area may be permanently displayed with various ads.

The statistics area 1624 is arranged slightly different with the game stat selector 1648, the play selector 1650 and the player selector 1642 located above the two columns of statistics for each team. A pull-down menu 1730 may also be provided. The pull-down menu 1730 may display various teams when the arrow portion 1732 of the pull-down menu is selected. The pull-down menu 1730 may select from any one of the active games or from the Red Zone Channel so that popular highlights from various games may be selected. The pull-down menu may also select a fantasy selection corresponding to the user's fantasy selections.

Referring now to FIG. 18, a user interface 1810 is illustrated having a similar configuration to that of FIG. 17. Again, common elements will not be discussed. In this embodiment, a highlight area 1820, a highlight portion configured differently than that of FIG. 16 is illustrated. In this embodiment, a pull-down menu 1830 having an arrow portion 1832 is provided. The menu portion, by selecting the arrow portion 1832, pulls down various team names for the sporting events that are live. In other embodiments, both live and completed sporting events may be selected. The highlight area 1820 may also include a video playback area 1840. The video playback area 1840 may thus play back highlights from selected links 1842. The links may thus be from a game related to the selection of a chip in the score area or game playing in the event area. The highlight video may also be unrelated to a chip or display in the first video display area. The links 1842 may be displayed in reverse chronological order for the sporting events provided in the list 1830. As can be appreciated, highlights for a different sporting event than that displayed within the video area 1620 may be provided. Each link 1842 may also include a thumbnail 1844 adjacent to the link 1842. A slide bar 1844 may be provided adjacent to the link so that more links may be displayed. Various numbers of links may be provided depending on design requirements. In this embodiment, four links 1842 are provided at any particular time. But up to 10 may be available by moving the slide 1844 with the cursor control device.

In this embodiment, highlights for various games or sporting events may be provided for different games or sporting events displayed in the video display area 1620. One of the choices available in the menu 1830 may be a Red Zone Channel that provides the last number of highlights for all of the sporting events and, thus, the links may be links to various plays from various games. A fantasy selection may also be provided so that fantasy statistics for selected fantasy players may also be provided. A link may be played within the video area 1840 or, if desired, a link can be grabbed by cursor control and dragged into the video area 1620 and played out in a larger format. After the highlight plays out, the video area 1620 reverts back to the live broadcast.

Figure 19:
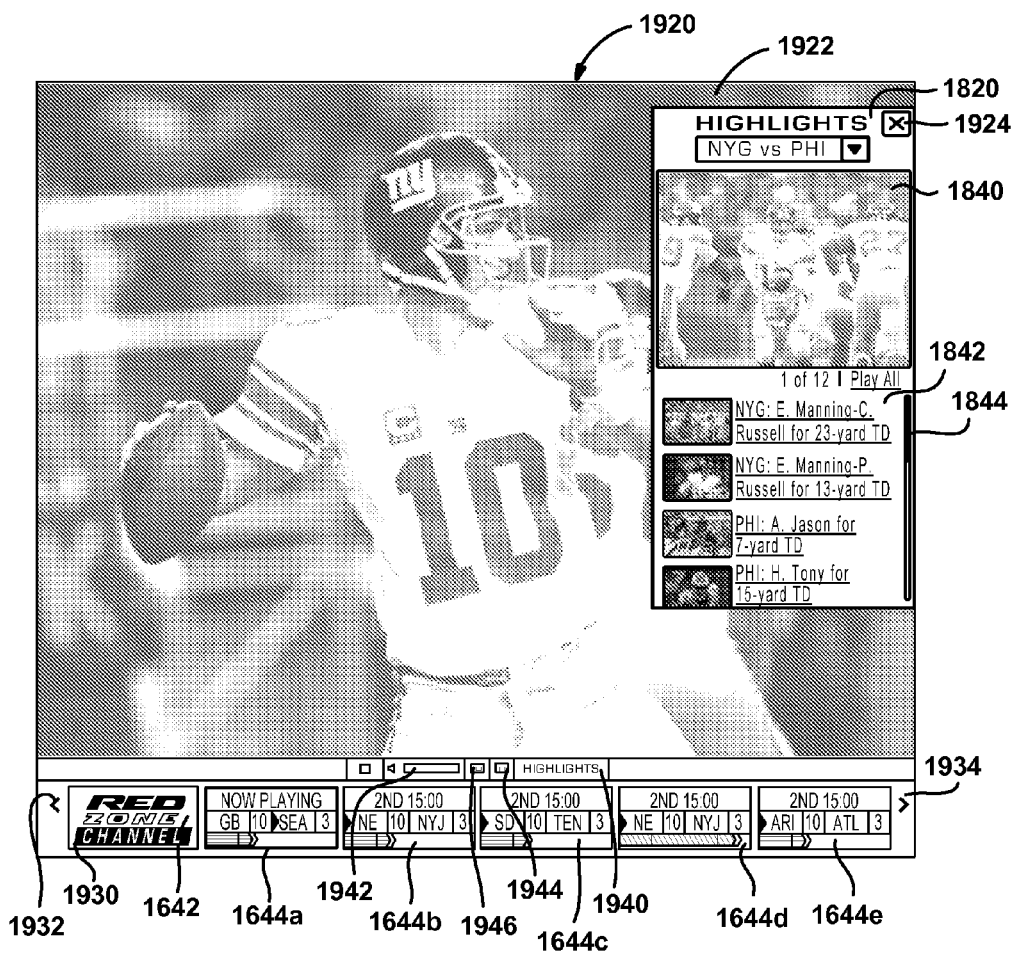
FIG. 19 is a fourth embodiment of a user interface for accessing data and video in a full screen format.

Referring now to FIG. 19, the video area 1620 illustrated in the previous figures may be expanded to have a full screen with overlay. In FIG. 19, a user interface 1920 is provided with a video area 1922 extending over the full screen. The highlights area 1820 with the video display 1840, links 1842 and the slide 1844 from FIG. 18 may be provided in a pop-up window. The pop-up window may be closed by selecting the "X" selector 1924. A score area 1930 may also be provided on the bottom portion of the user interface 1920. The score area may include selectable arrows 1932, 1934 for moving the chips to the right or to the left. The chips 1642 and 1644 may have similar functions to those described above. By selecting a chip 1642-1644, the video area 1922 may be changed. A highlight selector 1940 may be used to select and deselect the highlight area from being overlaid on the video area 1922. Other controls, such as a volume control 1942, and a divided screen selector 1944 may be provided. The divided screen selector may provide return to or out of the full overlay mode. A mini-mode selector 1946 may also be provided. The mini-mode selector may allow the user interface to enter a mini-mode as will be described below.

Figure 20:
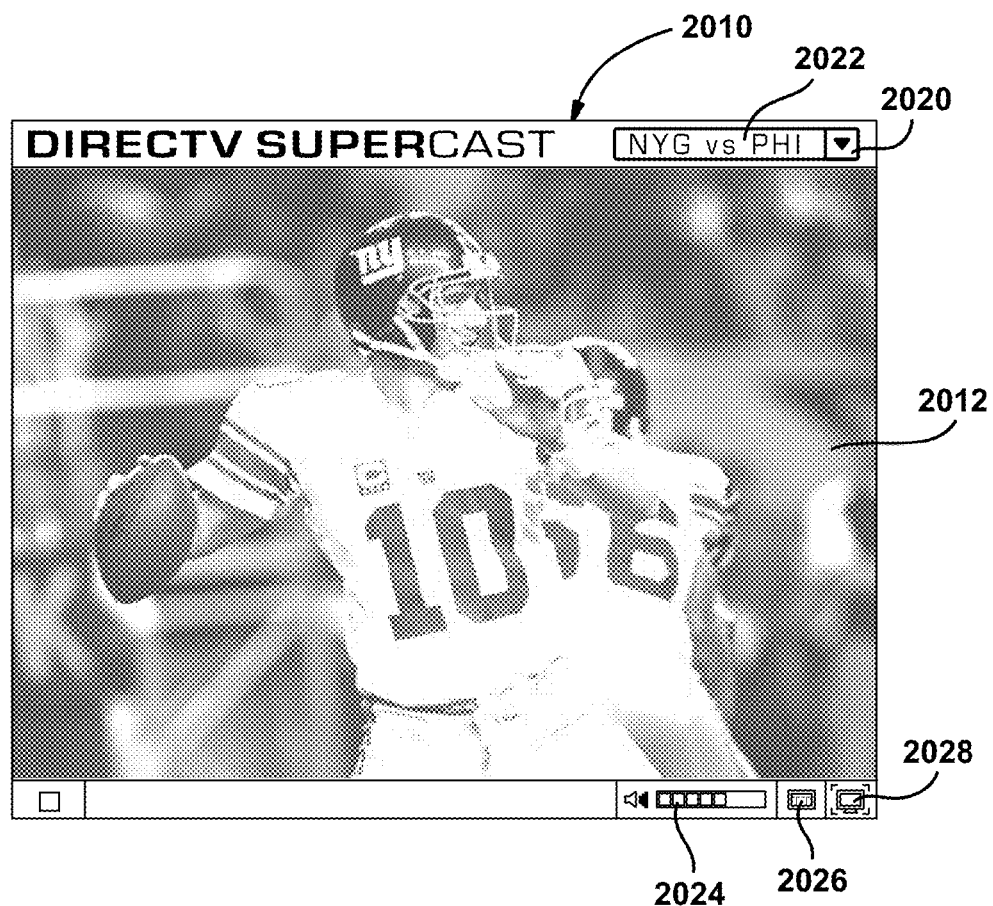
FIG. 20 is a fifth embodiment of a user interface for accessing video in a mini-mode.

Referring now to FIG. 20, a mini-mode user interface 2010 is illustrated. In mini-mode, the video area 2012 may be minimized to a pre-determined size. In mini-mode, the score area and the highlight area may not be illustrated. In mini-mode, a pull-down selector 2020 may be provided with an arrow 2022 for selecting a particular game or sporting event. A list may be provided so that different live games may be viewed by selecting a pull-down menu selection. By providing a mini-mode, other functions on a computer may be performed. A volume selector 2024, a regular view selector 2026, and a full screen selector 2028 may be provided. In mini-mode, the user interface 2010 may be moved around a screen display.

Figure 21:
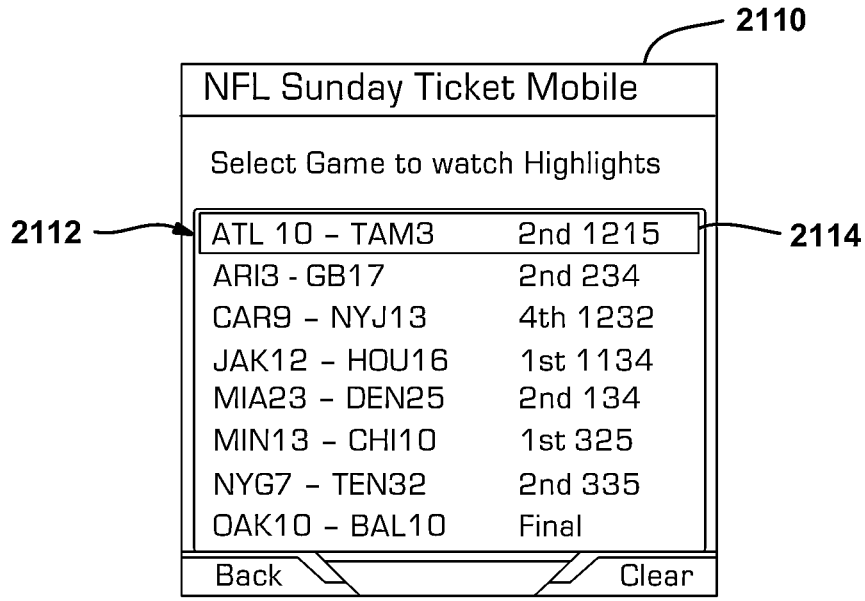
FIG. 21 is a screen display of a user interface for a mobile device.

Referring now to FIG. 21, a user interface 2110 for a mobile device such as a cellular phone is illustrated. In this embodiment, a web browser suitable for a cellular phone may be used to select highlights from different games. A score list 2112 may be communicated and displayed to the mobile device and displayed on the user interface 2110. A cursor 2114 may be scrolled up and down over the chips. The chips may be configured similarly to those described above in which a team name, a score, a time left, and a period or quarter may be displayed. By selecting one of the scores, highlights may be provided. The order of the highlights may be an alphabetical order with any finished games with a final score near the bottom.

Figure 22:
FIG. 22 is a screen display of a user interface for selecting highlights for one of the sporting events of FIG. 21.

Referring now to FIG. 22, when one of the games is selected a highlight list 2212 may be provided in the user interface 2210. By selecting one of the links from the list 2212 by moving the cursor 2214, a highlight screen may play the highlight in another screen. After playing the highlight, the user interface 2210 may reappear.

Figure 23:
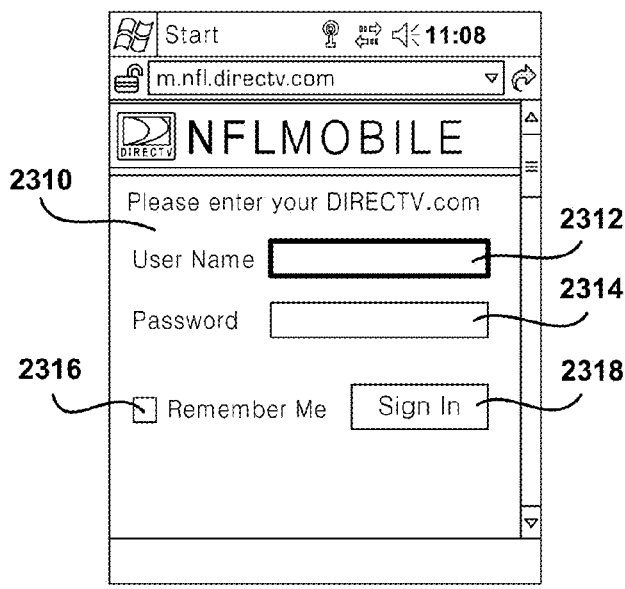
FIG. 23 is a screen display of a login screen for a mobile device.

Access to the user interfaces 2110, 2210 and 2310 may be provided through a logon system in a similar manner to that described above with respect to FIG. 7. That is, a user identification and password may be provided to access the system. However, as mobile devices become better and more content may be provided, a more detailed mobile display may be generated. In FIG. 23, a mobile browser generating a user interface 2310 is illustrated having a user name area 2312 and a password area 2314. A "remember me" box 2316 and a sign-in box 2318 may also be provided. Once the user name and password is provided, the sign-in box 2318 may be selected to sign in to the system.

Figure 24:
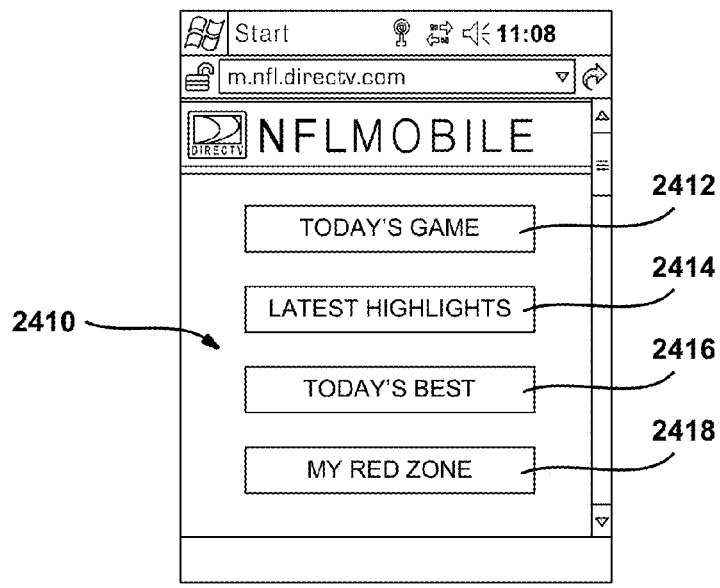
FIG. 24 is a screen display of a selection screen for a mobile device.

Referring now to FIG. 24, once a user has been authenticated into the system, a user interface 2410 may be provided with several selections, such as a Today's Game selector 2412, a latest highlights selector 2414, and a today's best selector 2416. By selecting the today's game selector, a user interface similar to that of FIG. 21 may be provided with a list of games. From the list of games, a highlight may be selected. By selecting the latest highlights selector 2414, a list of a number of highlights for the particular day may be provided. Of course, the selections and content of the menu may be different depending on the system. A my red zone selector 2418 may be used to select plays from teams of interest. Upon set-up of the service, a my red zone list may be provided so that particular teams of interest to the particular user may be selected. By selecting the my red zone selector only highlights from teams of interest may be provided in a highlights link list.

By selecting the Today's Best selector 2416, a list of the day's best plays from different teams may be provided.

Figure 25:
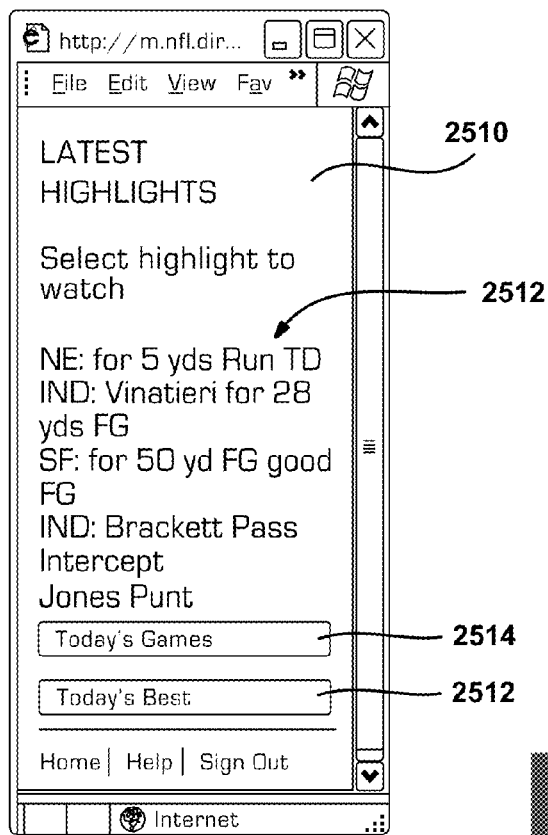
FIG. 25 is a screen display of a user interface for selecting highlights.

Referring now to FIG. 25, a user interface 2510 is provided to illustrate the latest highlights when the latest highlights selector 2414 is selected in FIG. 24. A list of highlights 2512 is provided. By moving a cursor, a selection may be made. The latest highlights are a compilation of the latest highlights from various teams. The highlight links 2512 may be similar to those described above in which a team name and a shortened description of the play may be provided. The highlights may be played out in the user interface 2610 of FIG. 26 described below.

A list of today's games may be provided on the user display by selecting the Today's Games selector 2514. A list of Today's Best highlights may be provided on the user interface by selecting the Today's Best sector 2516.

Figure 26:
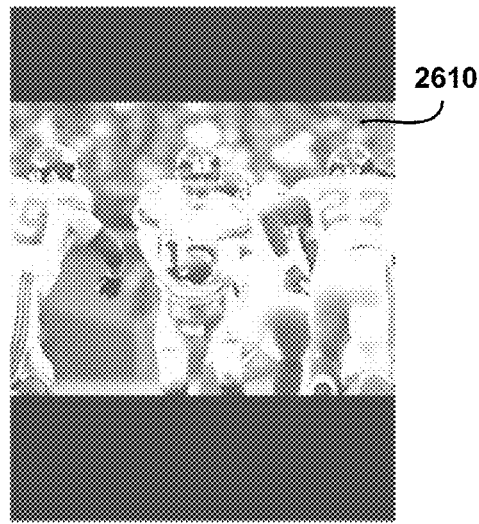
FIG. 26 is a screen display of a user interface for watching a highlight.

Referring now to FIG. 26, when a highlight is selected, user interface 2610 for displaying the clip is provided. The clip user interface 2610 play a clip stream after the device communicates an identifier to the content delivery network. After playing the clip, the screen display may return back to its previous selection menu.

A my red zone selector 2418 may be used to select plays from teams of interest. Upon set-up of the service, a my red zone list may be provided so that particular teams of interest to the particular user may be selected. By selecting the my red zone selector only highlights from teams of interest may be provided in a highlights link list.

Figure 27:
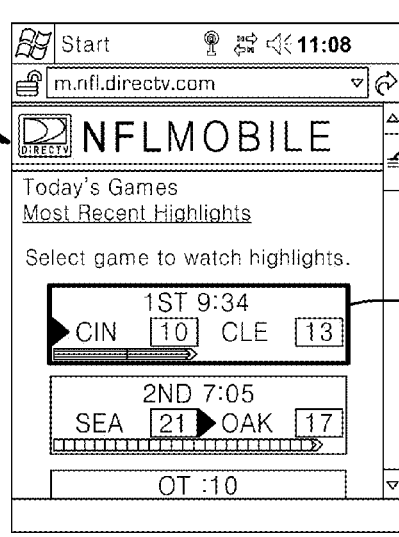
FIG. 27 is a screen display of a method for displaying chips for accessing highlights.

Referring now to FIG. 27, after selecting the most recent or latest highlight selector 2414, a user interface 2712 displaying a plurality of chips 2714 that correspond to links to various lists of game highlights may be provided. The chips 2714 may be configured like those above in FIGS. 16-18. Each chip may have a time period, a time within the period, the team names, a possession indicator, and a position selector. Because a mobile screen is relatively small, a slider 2720 may be provided to slide down so that additional chips may be selected. A Red Zone Channel chip or a fantasy football chip may also be provided in the list of chips. As is indicated, the first chip may be defaulted as selected and a cursor function may be used to scroll down to another chip. Various colors may be used to enhance the display.

Figure 28:
FIG. 28 is a screen display of a list of highlights for a particular game.

Referring now to FIG. 28, by selecting one of the chips 2714 in FIG. 27, a list of links 2812 are provided in the user interface 2810. The links may be detailed links 2812 corresponding to various plays of the game. A thumb nail 2816 may be provided for each of the links. Again, with each link a short description of the team, the players involved and a brief description of the play may be provided. Further, above the links a score indicator 2818 may be provided for the scores corresponding to the various links. A score, team name, period or quarter name and the time clock may all be provided in 2818.

Figure 29:
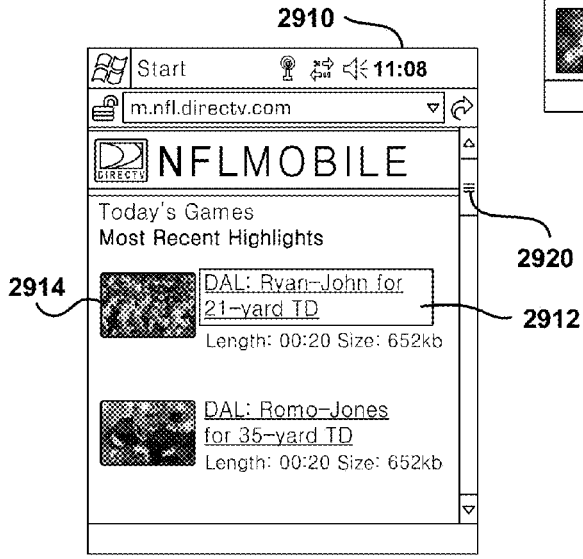
FIG. 29 is a flowchart of a method for accessing most recent highlights from various games.

Referring now to FIG. 29, by selecting the most recent highlights or Today's Highlights box, a plurality of links 2912 in a user interface 2910 may be provided. The links 2912 may be configured with a thumbnail or screen capture 2914 for various games. The screen may only display a limited number of links and, thus, the slider 2920 may be provided to slide down to select another link. At any one time, only a limited number of links may be provided. For example, five or ten links may be displayed.

Figure 30:
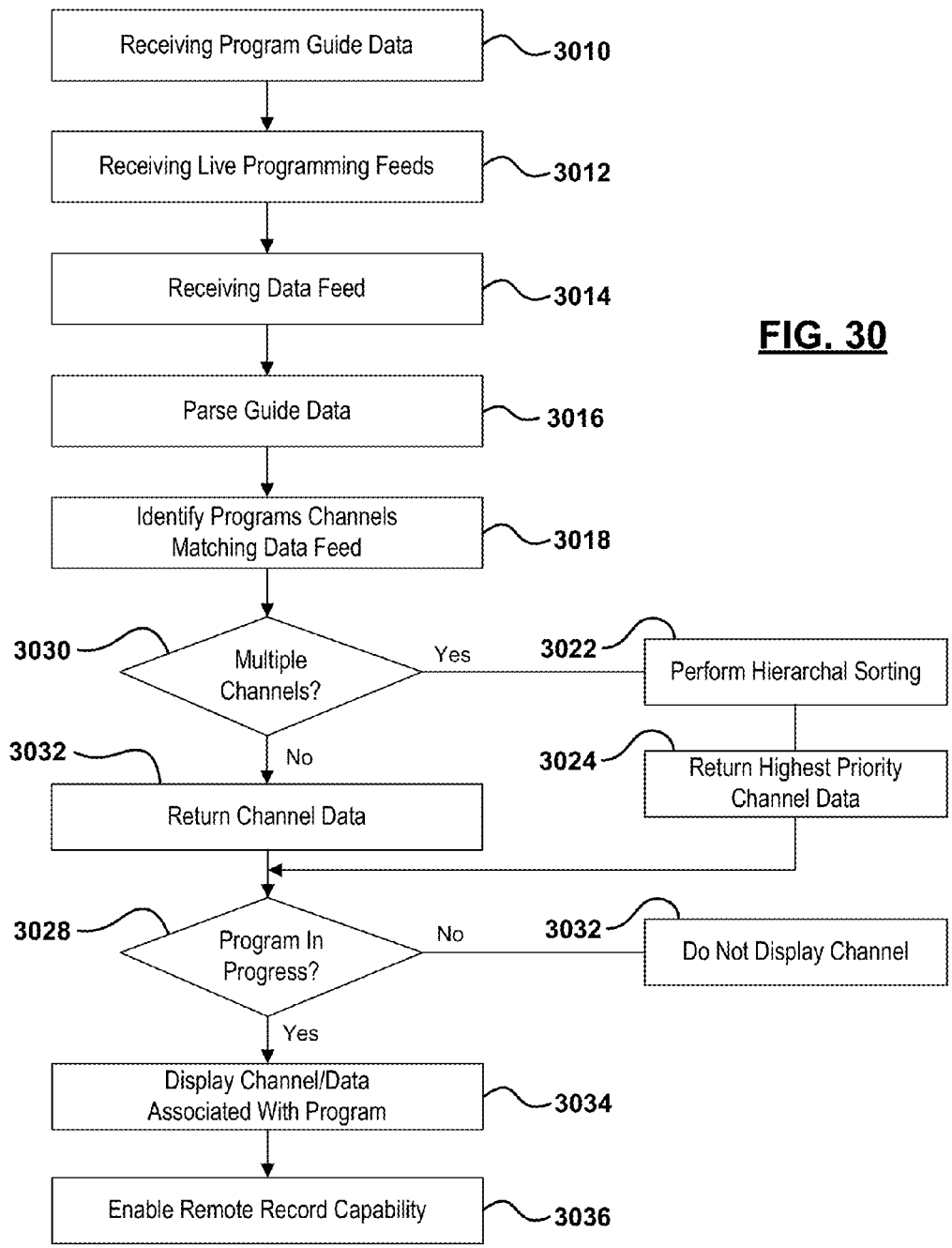
FIG. 30 is a flowchart of a method for matching data to program guide data for accessing channels.

Referring now to FIG. 30, a method for assigning channels to various data is provided. As was described above, channels may be received in live feeds. Also, in a separate feed, data may also be provided. When the live feeds arrive, they must be assigned to channels within the system and be broadcast.

In step 3010, program guide data is received or assigned. The program guide data may be assigned within the advanced program guide module 248 of the content processing system 102. In step 3012, video inputs such as live programming feeds or streams are received. In step 3014, data feeds are received. The data feeds may contain a single or multiple streams of data. The data may be formatted but may not be sorted in any other way. Groups of received data are compared to guide data. That is, the guide data is sorted or parsed until a likely match of the data is found. In step 3018, channels matching the data feed may be identified. This may be performed by an identification algorithm in which portions of the data are matched. For example, the team names, the type of sport, and other identifying characteristics may be parsed through to identify the channels. In step 3020, if multiple channels have been found, a hierarchical sorting may take place in step 3022. The hierarchical sorting may be performed in various ways. For example, local channels may be preferred over national cable networks, which may be preferred over subscription packages which in turn may be preferred over regional sports networks. If both high definition and standard definition channels are provided, high definition channels will take priority over standard definition channels. After the sorting, the highest priority channel data may be assigned in step 3024.

Referring back to step 3020, if multiple channels are not provided the channel data is returned in step 3026. After step 3026 and 3024, if a program is not in process, the channel is not displayed in step 3032. If the program is in progress in step 3028, step 3034 displays channel data associated with the program. The channel may be displayed in various formats including within or next to a chip or by rolling over a chip. By assigning the data a channel, the actual channel may not be displayed but by selecting a link associated with the data the channel may be selected without displaying the channel in the video display area of the user interface. The association of the incoming data (such as scores) may be displayed with variations of the program guide. For example, the program grid guide display may display that a Detroit Tigers game on channel 4 as is typical in a grid guide. However, the grid guide may, in addition, display a score or other data not typically associated with the program guide data. Thus the data feed data and the grid guide data may be combined in various ways. In step 3036, a recording may be enabled due to the assignment of a channel to the data. As mentioned above, by selecting a chip a recording selection to record the particular program to a user device may be provided. By assigning the channel to the data, a recording can be selected by selecting the chip.

Figure 31:
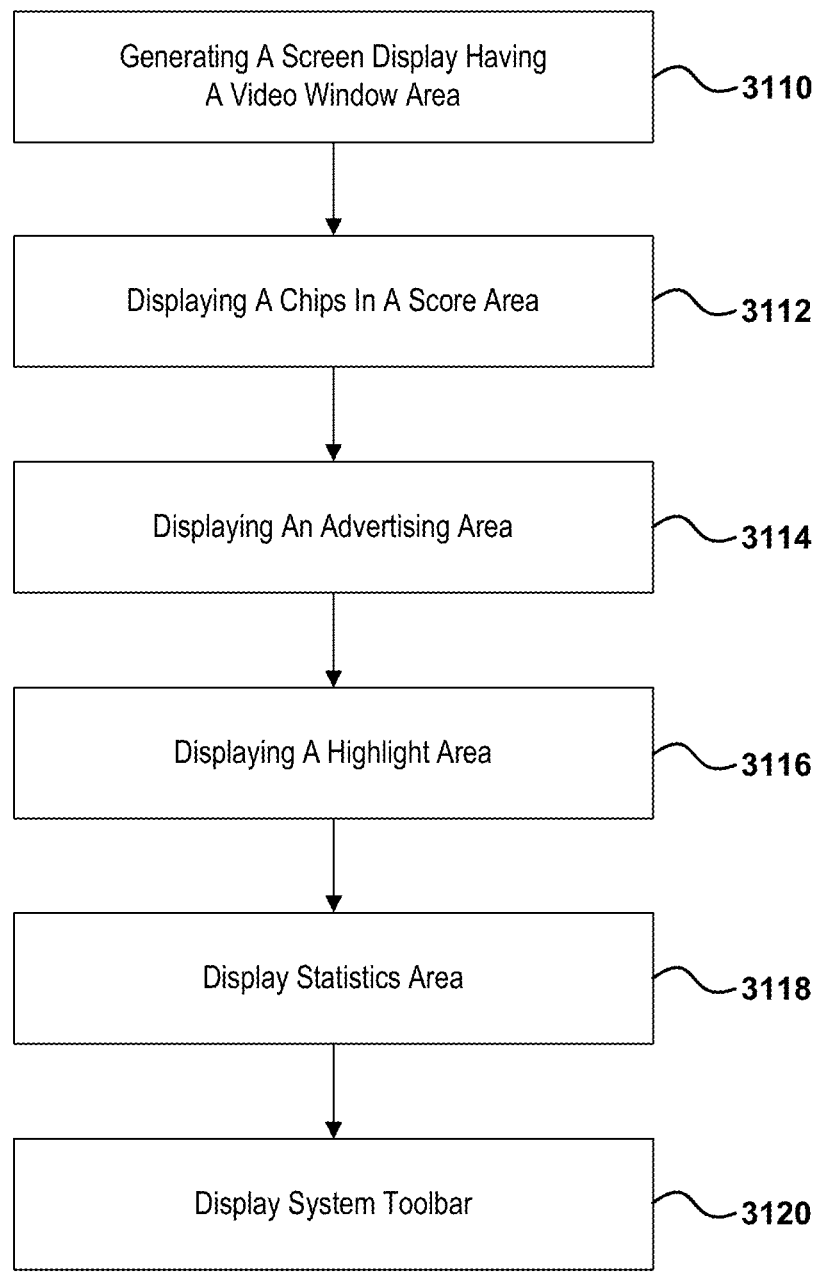
FIG. 31 is a flowchart of a method for operating a user interface.

Referring now to FIG. 31, a method of forming a display is set forth. As is illustrated above, the display may have various configurations with different portions displayed. The mobile display may also have various configurations that may correspond to providing only highlights on the mobile device.

In step 3110, a screen display having a video window area is provided. The screen display may also be referred to as a user interface since the user may be able to control various functions of the display.

In step 3112, chips are displayed in a score area. The chips may be formed from various types of data corresponding to the particular sporting event. Different sports may have different requirements. At minimum, for a sporting event, a score and team names are provided. Preferably, the time position within a game is also provided such as a quarter, a period, an inning, or the like. In an individual sport such as golf a player's name may be used.

In step 3114, an advertising area may be generated in the user interface. The advertising area may display a banner or the like in step 3114. The advertising area may also act as a link to link to various content provided by an advertiser.

In step 3116, a highlight area may also be provided on the user interface. The highlight area may be used to display highlights in its own video display or control the video display area of the user interface.

In step 3118, a statistics area may also be displayed. Various formats for the statistics area may be provided. As mentioned above, player statistics, game statistics, fantasy football statistics, or the like may be provided. Statistics may be provided for different teams as well. Selectable areas within the statistics area may be used for changing the statistics display.

A system toolbar may also be displayed in step 3120. The system toolbar may consist of various types of selectors including selectors for selecting a system toolbar may have various places throughout the user interface including at a top portion of the interface where various setting may be changed.

Figure 32:
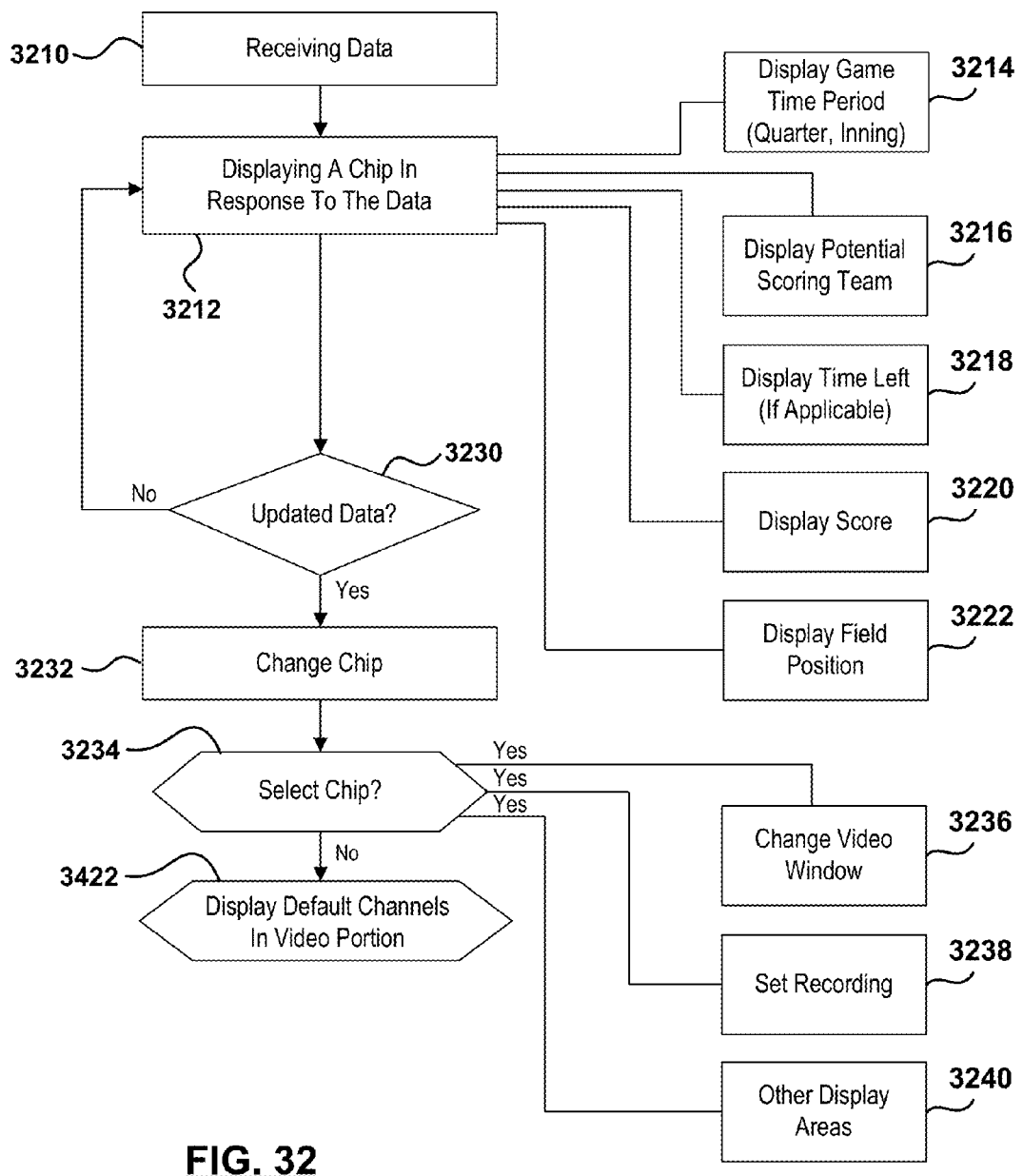
FIG. 32 is a flowchart of a method for using a chip to change the screen display.

Referring now to FIG. 32, a method for forming chips is provided. In step 3210 data is received for various events such as sporting events. In step 3212, a chip is configured and displayed in response to the data. The chip may have various portions of data therein, including displaying the time period such as a quarter or inning in step 3214. The potential scoring team may also be displayed in step 3216. If the game or sporting event has a time left in the quarter or time left in the game, the time left may be displayed in step 3218. A score may be displayed in step 3220. A field position, runner position, or general position of the game may be displayed in step 3222. Choices for boxes 3214-3222 may vary depending upon the event or sport.

After step 3212, step 3230 may determine whether updated data has been received. If no updated data is received, the chip continues to be displayed as above. If the data for any of the chips has been updated in step 3230, the chip may be changed in step 3232. In step 3234, if a chip is selected various events may take place. If a chip is selected, the video window may be changed in step 3236. An optional selection may provide a set recording for the particular game or sporting event. The particular game or sporting event may be recorded into a memory device within a user device in step 3238. By selecting a chip, other display areas may also be changed such as the statistics area and the highlights area. For example, the statistics area may be changed to display the statistics for the particular chips or game selected. Likewise, the highlights area may also be changed to display highlight links for the particular game selected.

In step 3242, if a chip is not selected, a default channel may be displayed in the video portion. The default channel may, in this example, be the Red Zone Channel which displays a continuous stream of live video feeds from various games with various scoring opportunities.

Figure 33:
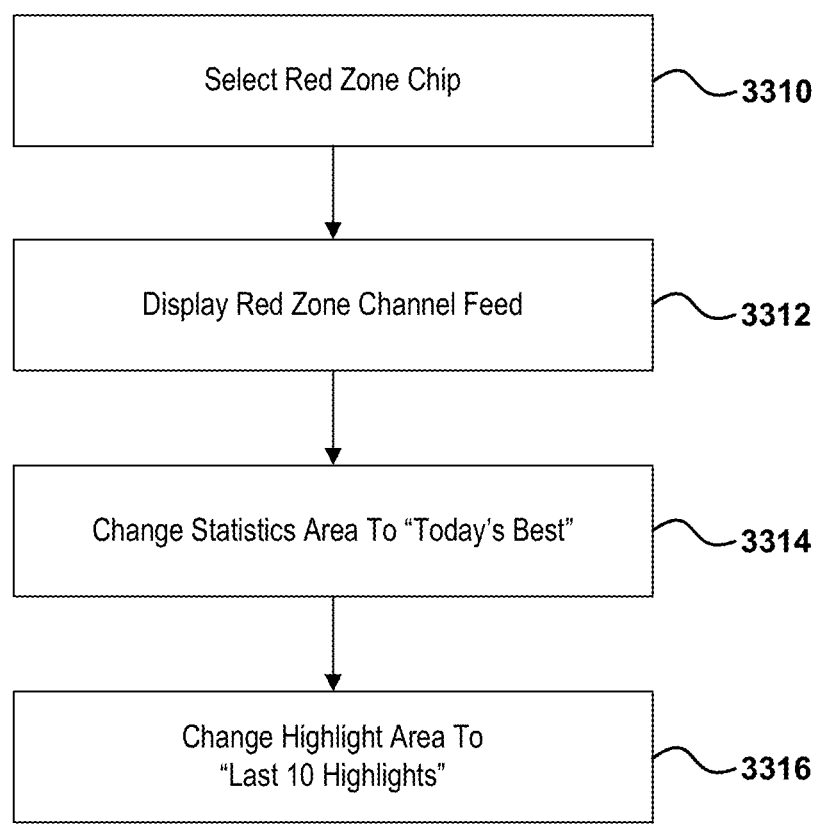
FIG. 33 is a screen display of a method for operating a user interface by selecting a red zone chip.

Referring now to FIG. 33, a method for changing the display according to the selection of a red zone chip is provided. In step 3310, the Red Zone Chip in the score area is selected. In step 3312, a channel feed corresponding to the Red Zone Channel may be displayed in the display. In step 3314, the statistics area is changed to today's best which encompasses multiple teams. In step 3316, the highlight area may be changed to the last 10 highlights from all the teams currently playing. The last 10 highlights may also be from all the teams playing on a particular day.

Figure 34:
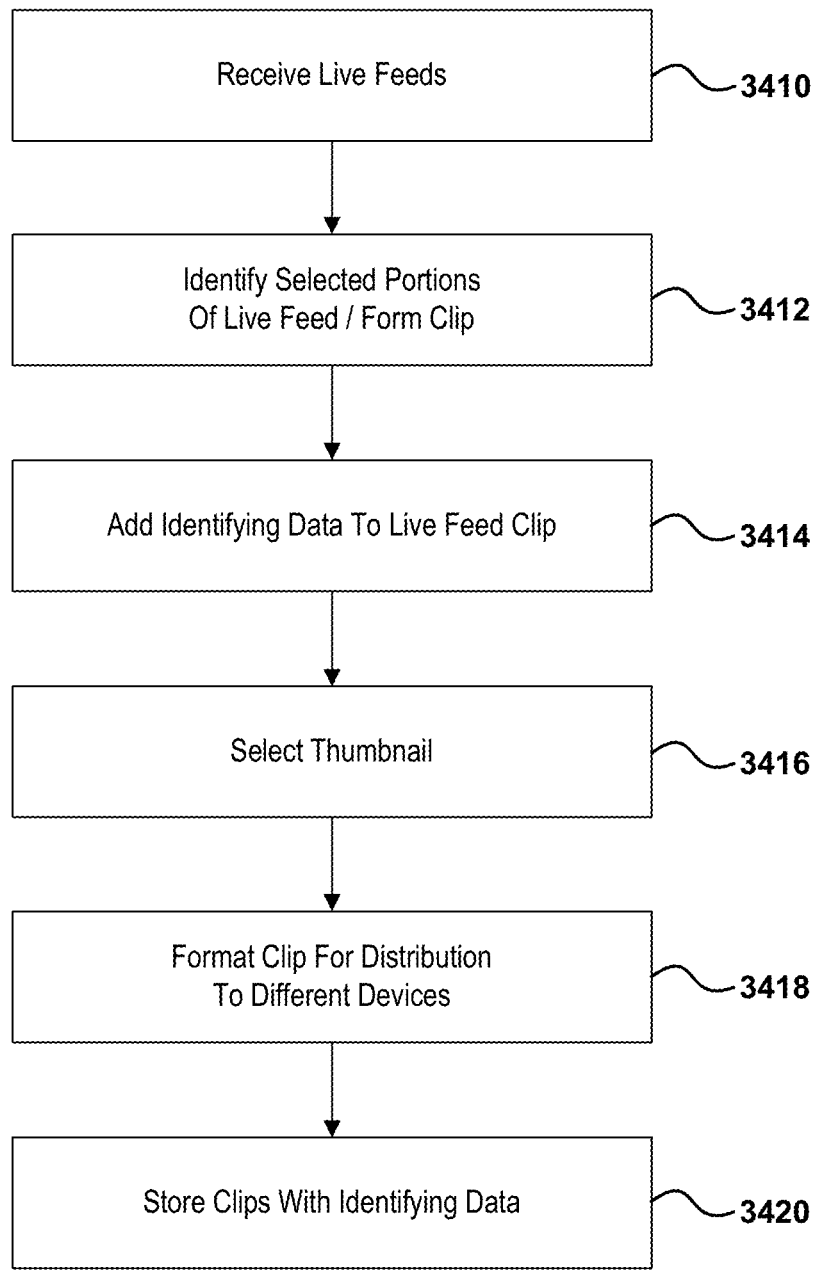
FIG. 34 is a flowchart of a method for forming highlight chips.

Referring now to FIG. 34, a method for forming highlights is provided. In step 3410, live feeds are received. In step 3412, selected portions of the live feeds are used to form clips in the clip-forming module 225 of FIG. 2A. The clip-forming module 225, as mentioned above, may be part of the content management system. The content management system 221 may store the clips in the content repository 274. In step 3414, data corresponding to the clip is identified. Identifying data such as the players involved, the score at the time, the number of yards or any other identifying information, may be stored with the clip. The data may be referred to as metadata so that the various links may be performed. Link data may also be identified.

In step 3416, a screen capture may be used to form a thumbnail of the clip so that it may be conveyed and displayed on one of the user interfaces as described above. The thumbnail may be associated with the clip in the content repository. In step 3418, the clip may be formatted for different devices. For example, low-resolution phones, high-resolution phones, set top box applications may all have different versions of formats for clips. The clips may be provided all the way up to high-definition resolution. The various versions of the clips are stored in the content repository 274 of FIG. 2A. In step 3420, the clips with the identifying metadata are stored in the content repository. The clips may be formed so that they may be easily sorted and provided in response to selected links from the various user devices.

Figure 35:
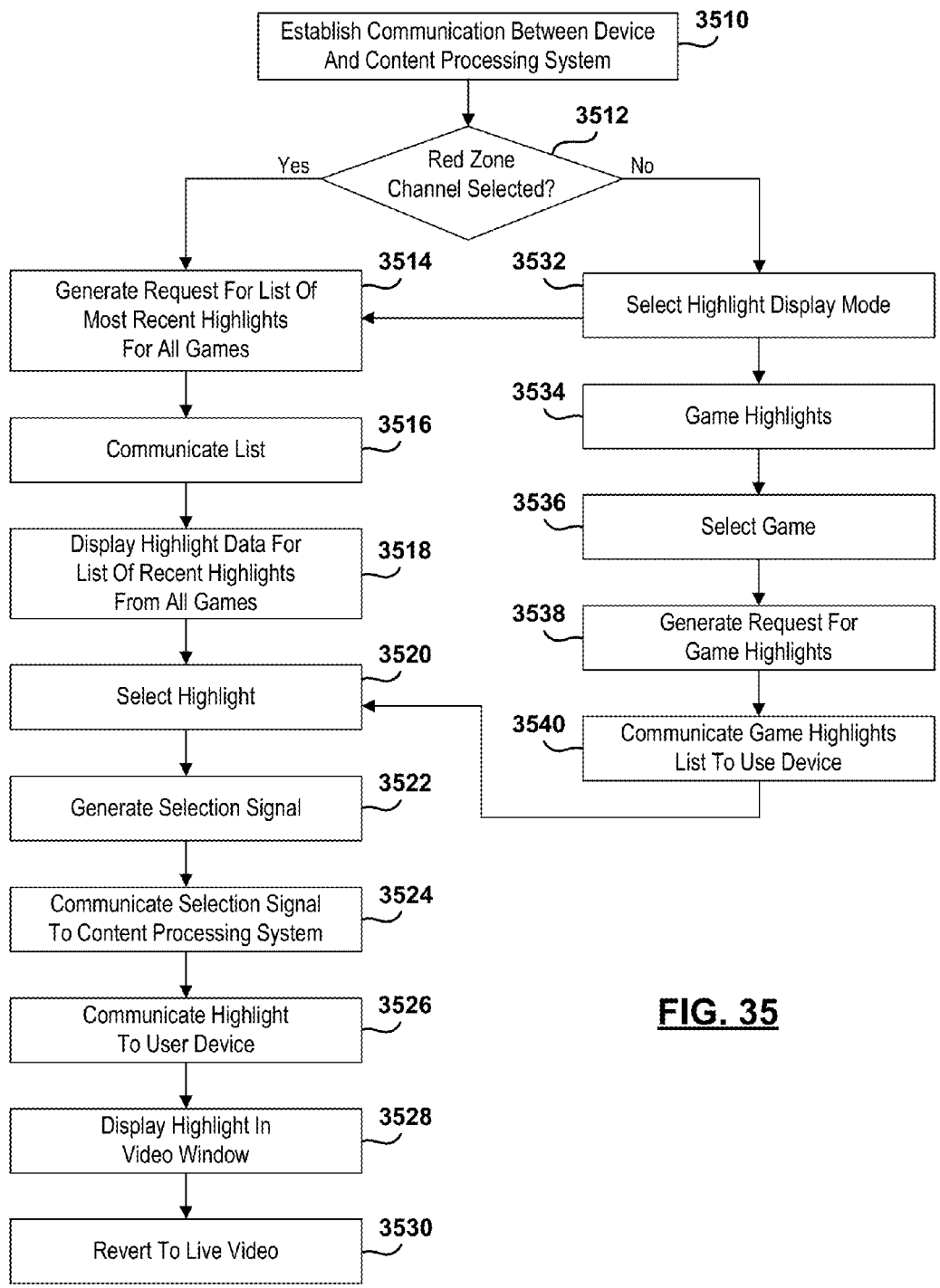
FIG. 35 is a flowchart of a method for changing a user interface.

Referring now to FIG. 35, a method for using the highlight clips generated is set forth. In step 3510, communication between the device and the content processing system is established. This may be performed by logging in and providing a user name and password as provided above. Conditional access may also be used for authorizing the communication between the content processing system and the user device. In step 3512, if the Red Zone Channel is selected, a request for the most recent set of highlights may be generated in step 3514. The request for highlights may be received at the content repository for all of the games being played or event. In step 3516, links corresponding to the highlights are communicated to the user device. In step 3518, a display listing the highlight links is set forth for all games. In step 3520, a highlight may be selected. The user device may move a cursor or make another form of selection to form a selection signal corresponding to the highlight in step 3522. The selection signal may have an identifier associate therewith for identifying the highlight clip.

In step 3524, the selection signal is communicated to the content processing system. The selection signal may be communicated through a wired or wireless system such as through the Internet, through a mobile phone system, a public switched telephone network (PSTN) or the like. The method for communicating may vary depending on the type of device. For a mobile phone device, a cellular phone network may be used for communicating. For a fixed set top box or computer, the communication may take place over a wired Internet communication system.

In step 3526, the highlight clip is communicated to the user device. The highlight clip may be communicated using the same type of communication network as the request or selection signal. However, the highlight clip may be communicated in a different way as well. The highlight is retrieved from the content repository based upon the selection signal and communicated to the user device through a content delivery network. In step 3528, the highlight is displayed in a video window. The primary video area of the display or separate highlight display may be used for displaying the highlight.

In step 3530, if the primary video display, such as that illustrated in FIGS. 16 and 17, is used to display the highlight clip, the video display may revert back to the live video selected by the chip once the highlight clip has ended. After step 3530, step 3514 may be again performed.

Referring back to step 3512, if the Red Zone Channel has not been selected, a highlight display mode may be selected. The highlight display mode may come from a highlight selector which was described above. If the highlight display mode in step 3532 is used to indicate or select the most recent highlights, then steps 3514-3530 are performed.

In step 3532, if the highlight display mode is selected for game highlights, step 3534 is performed in which highlights for the particular game are provided. As mentioned above, in step 3534 game highlights may be provided for an arbitrary number such as the last ten plays or five plays of the game, depending on the system requirements. Other numbers of highlights based upon system capacity and the like may also be provided. In step 3536, a game may be selected by a pull-down menu or by selecting a new chip. A pull-down menu is illustrated in FIG. 18. In step 3538, a request for game highlights is thus provided for the particular game and communicated to the device in step 3540. It should be noted that game highlights for a game different than that selected by the chip may be provided. That is, a different game may have the most recent highlights displayed while a live feed from another game is displayed in the video area. After step 3540, steps 3520-3530 may be performed. These steps correspond to selecting and displaying the video corresponding to the highlight. It should be noted that in the highlight window a separate highlight video display may be provided. The highlight video display may be active at the same time as a live feed. Thus, a highlight may be played for a different game in the highlight video display area.

Figure 36:
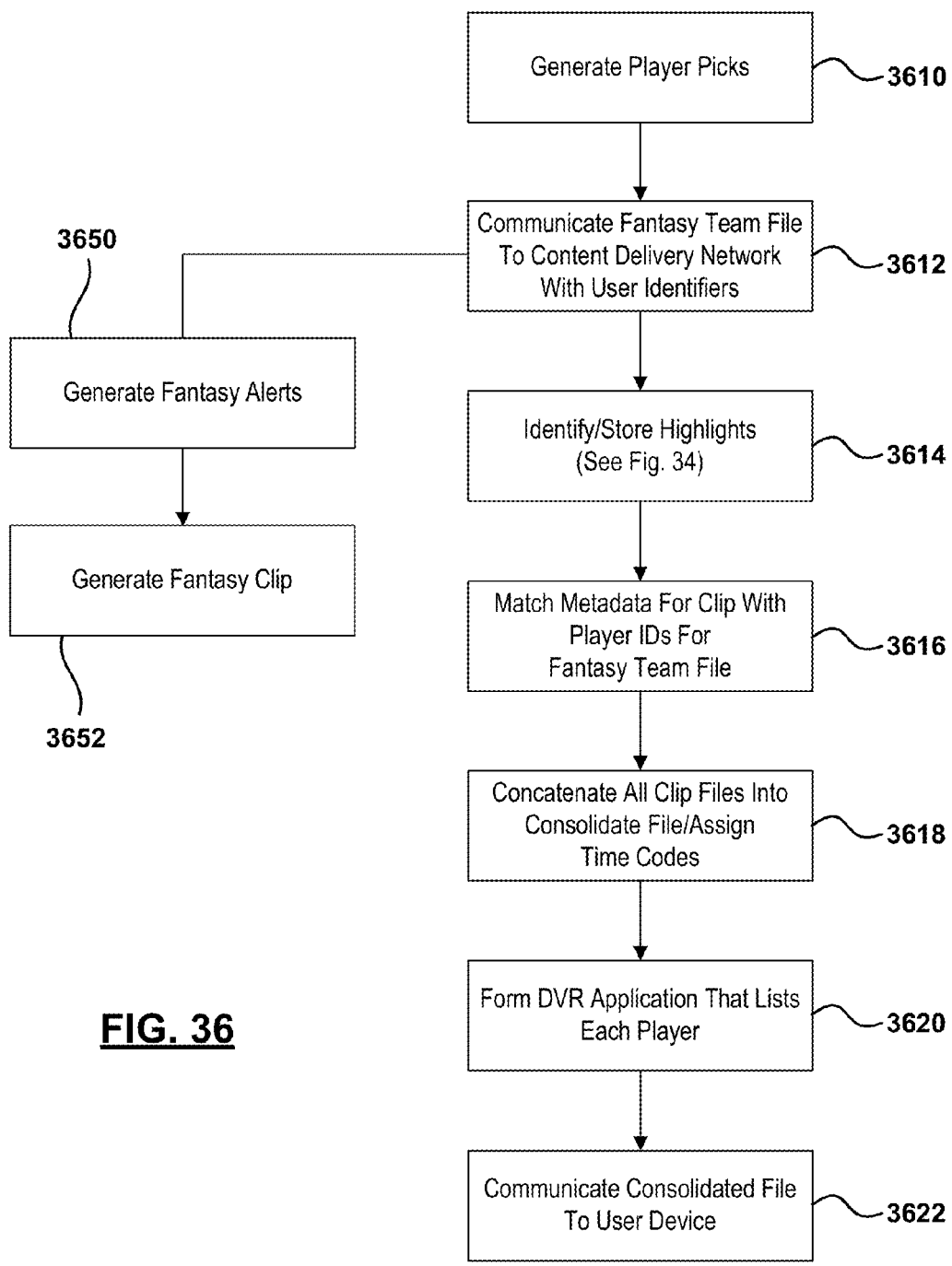
FIG. 36 is a method for forming a consolidated fantasy clip.

Referring now to FIG. 36, the system may also be used to support fantasy video gaming. In fantasy video gaming a player such as the user of the user device may select various team members for his team from actual team members across the league. Player picks may be selected at the set top box or by a web interface such as DIRECTV.com illustrated as 244 in FIG. 2A. A player picker is illustrated in FIG. 16A. Mobile devices may also be used to select various team members. Third-party services may also be used to select players. These services may be partners of or interface with the primary service provider of the content processing system. A fantasy team file may thus be communicated to the content processing system in step 3612. User identifiers associated with the various players may be communicated rather than actual names. In step 3614 highlights are stored and identified. The details of this step are provided in FIG. 34.

In step 3616, the metadata for the clip is matched with the player IDs for the fantasy team. In step 3618, a clip file is formed by concatenating and assembling all clip files associated with the player IDs for the particular user. Time codes may be assigned to the entire consolidated file.

In step 3620, a DVR application that lists each player may be provided with the consolidated file. The DVR application may allow various plays from each player to be played out continuously by player. The entire file may also be continuously played out. In step 3622, the consolidated file is communicated to the user device. The consolidated file may be formed after the day in which the games were played. The files may then be communicated at a later time. The files may be communicated in various manners including through a broadband Internet connection. The files may be stored on the user's device in a memory such as a digital video recorder. The content delivery network through the communication network is used to communicate the fantasy file. The consolidated files may be delivered via satellites on channels assigned to the particular sport but are no longer used due to the ending of the sporting events. For example, a satellite channel may be allocated until midnight but the games may be over in the afternoon. The unused capacity of the unused channels may communicate the consolidated files.

Referring back to step 3612, after the user's player picks are selected and communicated to the content processing system, step 3650 may allow fantasy alerts to be provided on the display. Fantasy alerts may be provided in various locations on the user interface for specific types of plays such as running plays, rushing plays, two-point conversions, or the like. Receivers and quarterbacks may also have separate types of alerts. For other sports besides football, alerts such as extra base hits, hits, or the like may also be provided.

The way in which an alert is provided may be changed based upon the importance of the alert. For example, different colors or different sounds may be played for different types of alerts. For example, if a near scoring-type opportunity is presented, a more urgent alert may be provided. Different alerts may also be provided for different types of devices. For example, a mobile user device and a set top box may have different types of alerts.

As described above in FIG. 16, a fantasy chip may be generated in box 3652. A fantasy chip may be selected for an individual's fantasy player as well as comparing the individual with another player, thus a "my score" and an "opponent's score" may be generated as a chip.

Interactive gambling may also be supported, where legal. Betting may take place for various aspects of the games. The bets may be monitored by the system and alerts provided based on the bets.

Figure 37:
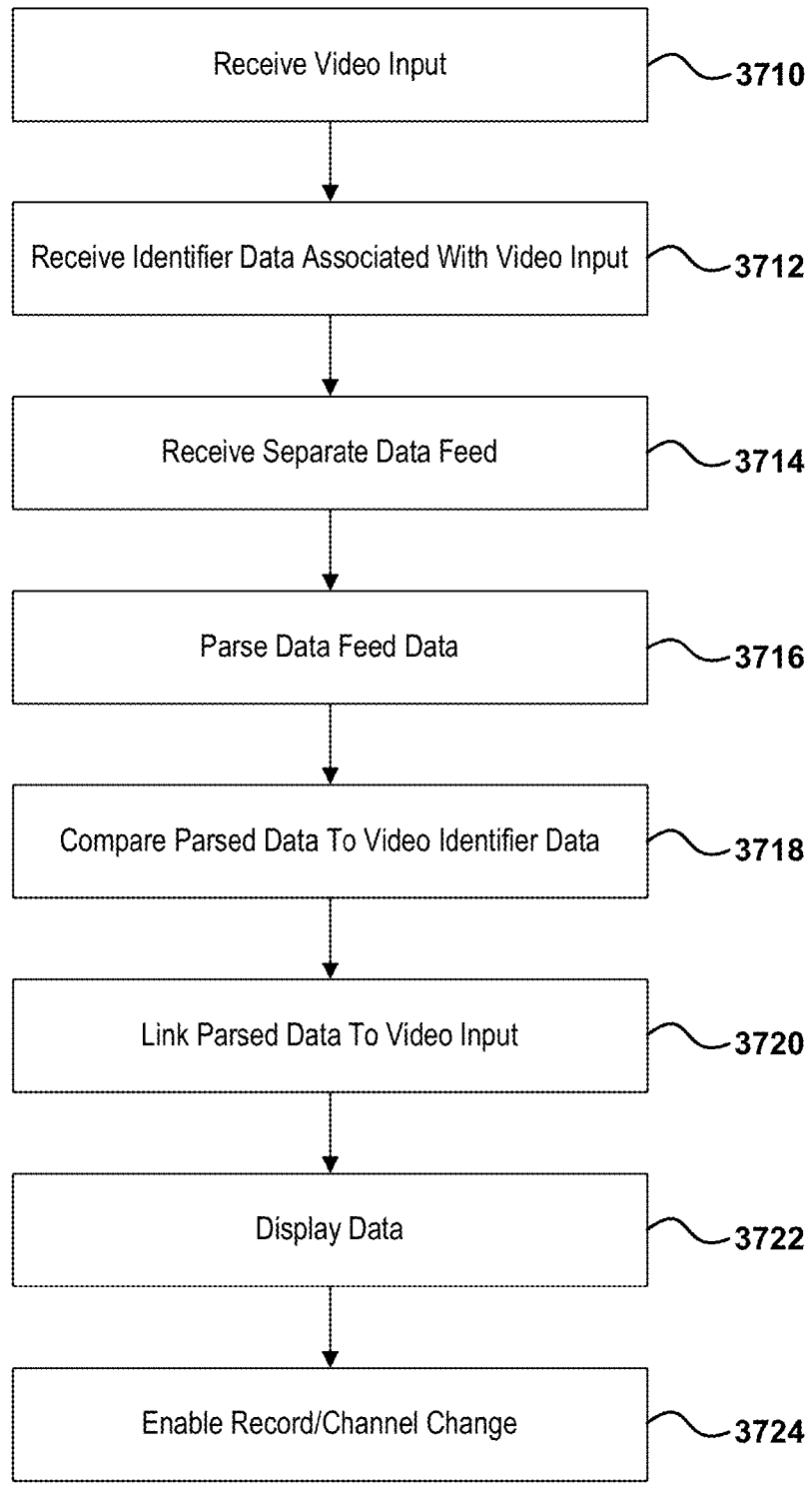
FIG. 37 is a flowchart of a general method of associating a data stream to a video input.

Referring now to FIG. 37, a method for associating a video input with data is set forth. This method is an alternative to that set forth in FIG. 30.

In step 3710, a video input is received. The video input may correspond to programming channels, video streams, live streams, or the like. In step 3712, identifier data is associated with the video input. The identifier data for the video inputs may be received in various ways. A programming table may have identifying data, the data may be manually entered, or the data may be associated with the video stream and metadata. The identifying data may include a network source, an identifier for the stream such as a numerical identifier or an alphanumerical identifier, or further data such as a team name or names.

In step 3714, the separate data feed or feeds are received. The data feeds may be raw data received from various sources such as a scoreboard or a sporting event. The data may be manually entered at some location and transmitted as a feed. A typical data stream may include a continuous stream of data.

In step 3716, the data feed data is parsed into groups. The data may be formatted so groups of data may be identified. Each group may pertain to a sporting event or groups of events. Parsing may take place with respect to identifying data such as team names, city, names, scores etc. In step 3718, the data feed data that has been parsed is compared to the video identifier data. In step 3720, the parsed data is linked to a video input. In step 3722, a display of the data may be performed. The data may be displayed in various manners, including chips or various pop-ups on a display. The display may be a video display displaying a video channel stream or other video input. The display may not be related to the data. That is, scores for a particular team or data for a particular event may be displayed on a video for an unrelated event.

In step 3724, the display may also act to enable recording or a channel change. For example, if a chip is displayed with a particular score, a channel may also be displayed at the same time. By selecting the chip or the channel, the particular selected channel may be tuned on the particular display. Likewise, a recording for recording the selected event on the DVR associated with the display may also be performed.

Figure 38:
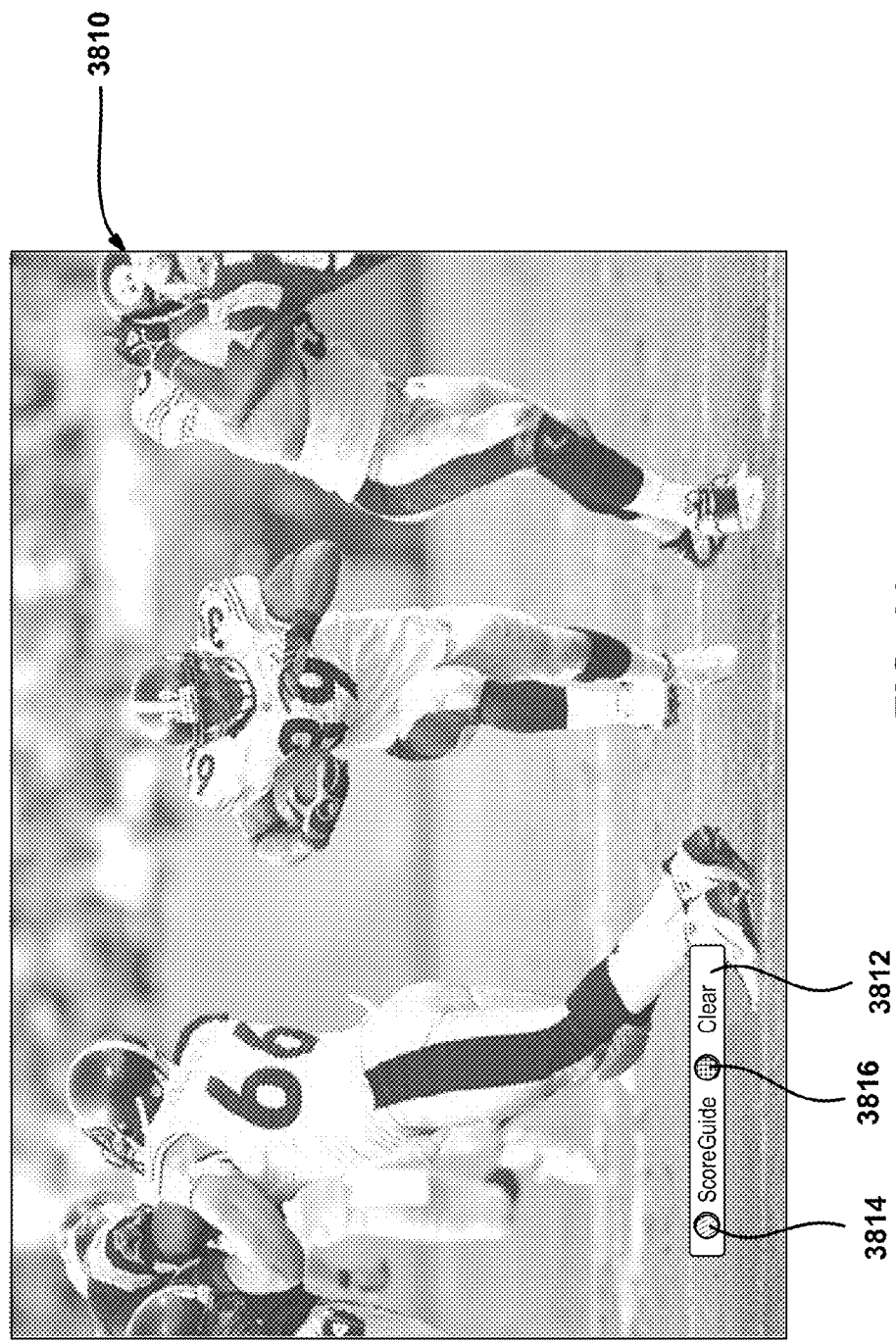
FIG. 38 is a screen display having a user interface for initiating a score data interface.

Referring now to FIG. 38, an example of a screen display 3810 that has an icon 3812 that includes a choice for selecting a "score guide" 3814 is displayed. The selector 3814 may be used to open or increase the size of a score area. A clear selector 3816 may be used to clear the icon 3812 from the screen. The icon 3812 may appear when a channel is tuned to remind the viewers that the score guide is available.

Figure 39:
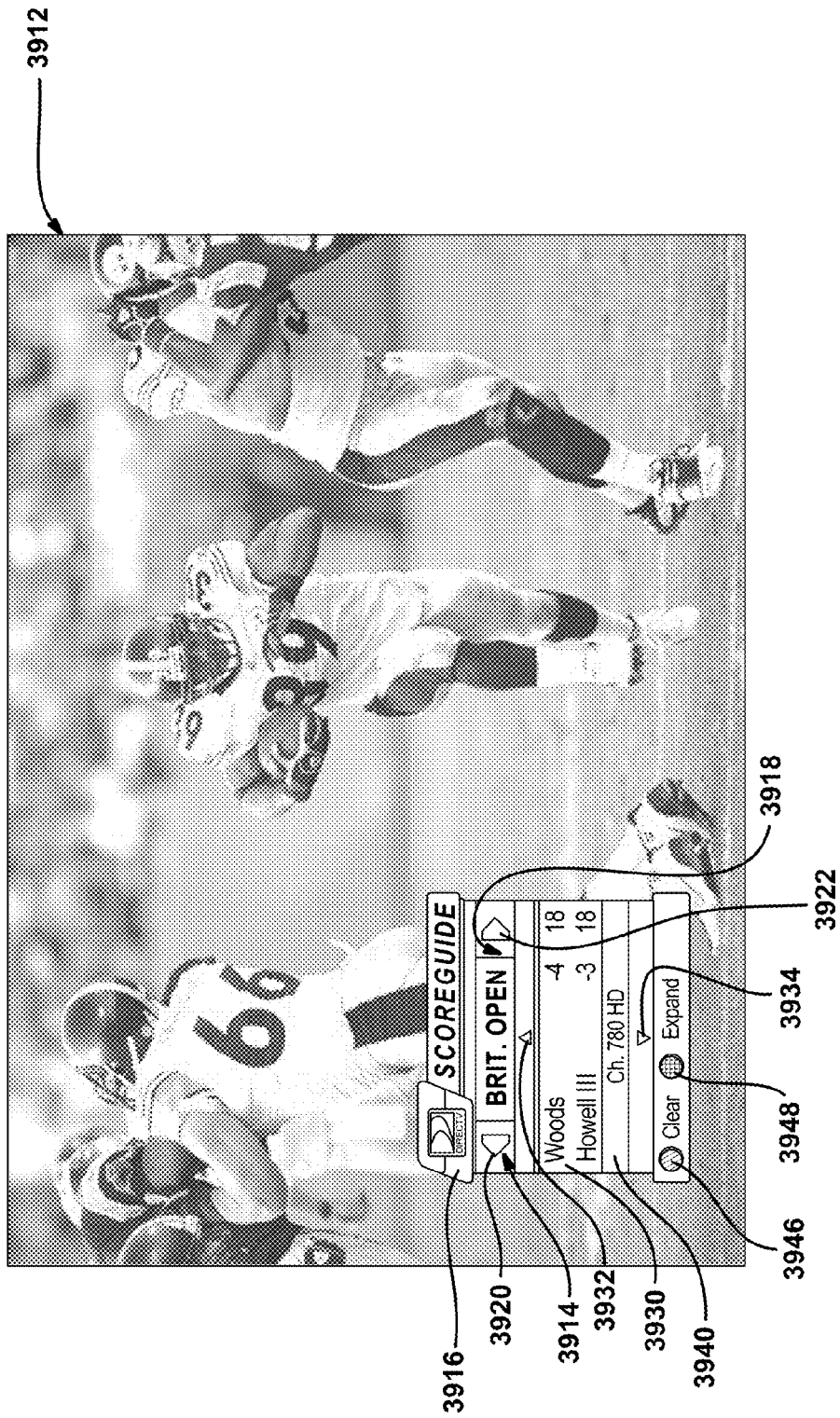
FIG. 39 is a screen display having user interface display for displaying a single interactive chip.

Referring now to FIG. 39, a screen display 3912 illustrates an example of a single chip on the screen. The score guide icon 3914 may include a top line with a title identifying the service 3916; a second line of the icon 3914 may include the sporting event 3918 with arrow selectors 3920, 3922. By selecting one of the arrows a different sporting event's scores may be displayed. In this example, a golf event "British Open" is provided. Another portion of the icon 3914 may include a score area 3930. In this example, two golf scores are provided. In a golf event, there are multiple players. Therefore, arrow selectors 3932 and 3934 may be selected to move up and down a list of players. Should the sporting event display comprise teams, various team scores may be displayed in the area 3930. Further, a channel area 3940 may also be displayed. By selecting the channel area by moving a cursor controlled by a remote control or other user interface, the channel may be selected. A clear selector 3946 may be used to clear the score guide from the screen. An expand selector 3948 may be used to expand the scores to a larger area on the screen.

Figure 40:
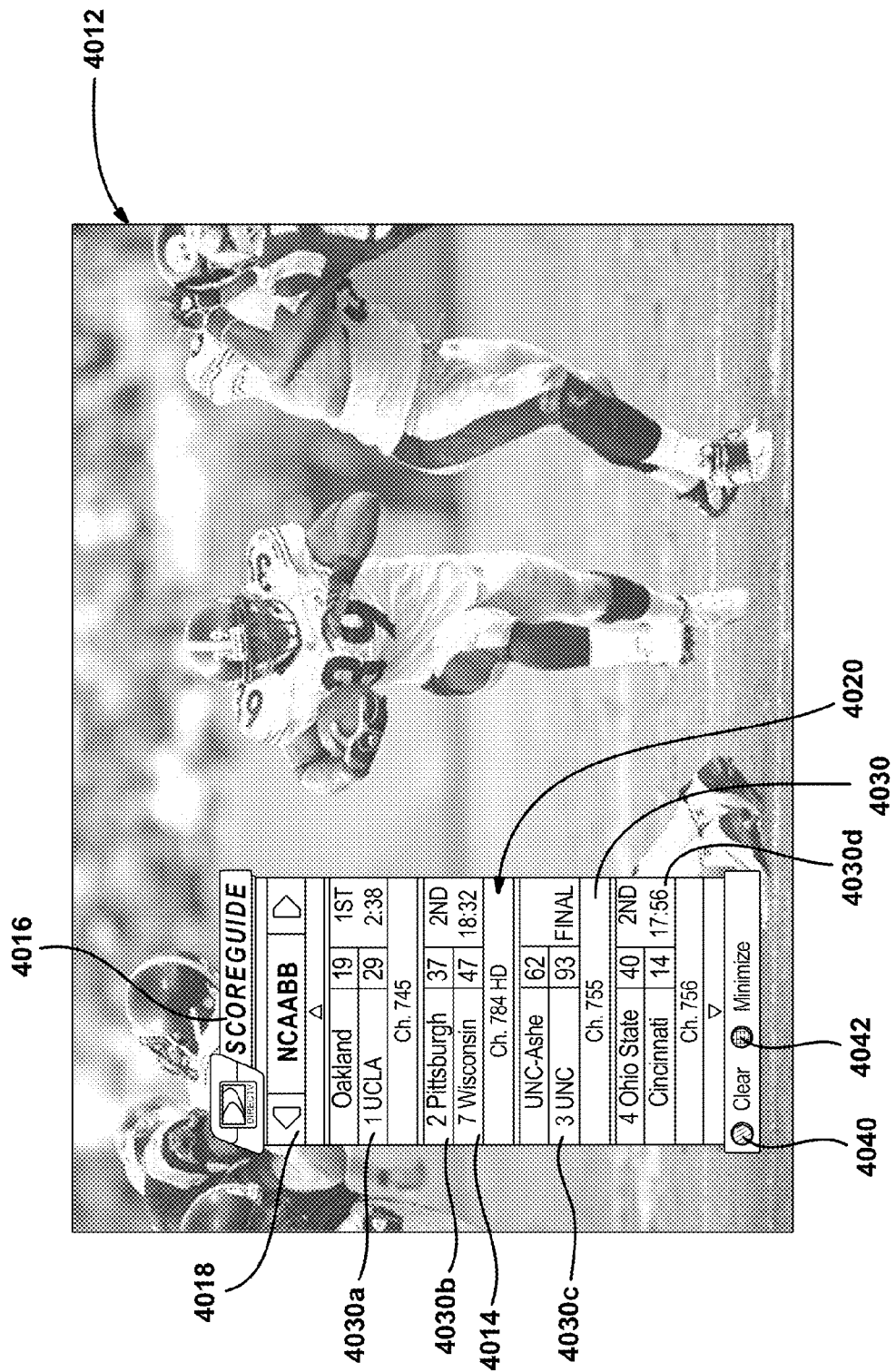
FIG. 40 is a screen display having a user interface display for displaying multiple interactive chips.

Referring now to FIG. 40, when the expand selector 3948 of FIG. 39 is selected, a screen display 4012 may include an expanded icon 4014. The expanded icon may also include a title of the service in area 4016, a league or sport identifier area 4018, and a score area 4020 that includes multiple scores for multiple events. Each of the events may correspond to the sport displayed in the area 4018. Each of the sporting events may have an associated channel if the event is currently being broadcast. By selecting one of the chips 4030A, 4030B, 4030C or 4030D the channel may be tuned to the display 4012. A clear button 4040 may also be displayed in the larger display area. Also, a minimize selector 4042 may also be displayed at the same time. By selecting the minimize selector 4042, the score area may be reduced to one team or a few lines, such as that displayed in FIG. 39.

Arrow selectors 4050, 4052 may be used to select a different sport or category. Arrows 4052, 4056 are up/down arrows for displaying different chips of or scores within a category, sport or sports league.

Figure 41:
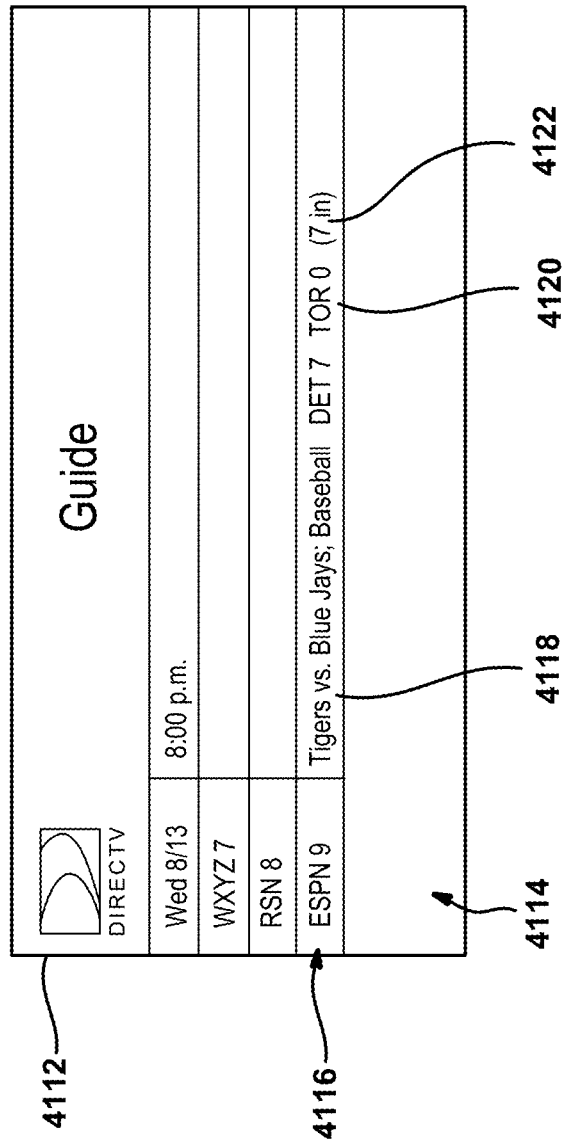
FIG. 41 is a screen display of a program grid guide having data from a data stream.

It should be noted that the channel selector 3934 or 4050 may display multiple pieces of data. In this example, only the channel numbers are provided as well as an indication of whether the channel is a high-definition channel or a standard-definition channel. In addition, various other information such as the call letters of a channel, the network of a channel, the region of the channel, or other brief identifiers associated with the channel may be provided. It should be noted that various portions of the program guide data may be associated with various aspects of the received data. For example, program guide data may take advantage of the additional data and display a score in the program grid guide. This is displayed in FIG. 41. In FIG. 41, a screen display 4112 is illustrated having a portion of a grid guide 4114. In this example, a sports network is illustrated in row 4116. A typical grid guide includes a description of the programming 4118 which, in this case, is the Detroit Tigers vs. The Toronto Blue Jays baseball. In addition to the screen display, data from a data feed may also be provided in the grid guide. In this example, the data 4120 corresponding to the score is provided. In this example, the score is Detroit 7, Toronto 0. The status of the game, such as the period or inning or other time period, may also be provided by indicator 4122. In this example, the game is in the $7^{th}$ Inning. Other types of indicators may also be provided depending upon the sport or event.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method comprising:
 displaying a first video from a live feed in a first video display area of a screen display;
 communicating a plurality of highlight links to a user device, said highlight links corresponding to highlight clips of selected portions of the live feed;
 displaying the plurality of highlight links in a second display area of the screen display simultaneously with the first video in the first video display area;
 selecting a first link of the plurality of highlight links to form a selection signal;
 communicating the selection signal to a remote location located remotely from the user device;
 communicating a highlight clip of the highlight clips corresponding to the selection signal to the user device from the remote location;
 displaying the highlight clip in the first video display area by replacing the live feed; and
 when the highlight clip is complete, redisplaying the live feed in the first video display area.

2. A method as recited in claim 1 further comprising:
 receiving a live feed;
 selecting a portion of the live feed to form the highlight clip;
 associating metadata with the highlight clip; and
 storing the highlight clip and the metadata in the remote location.

3. A method as recited in claim 2 further comprising determining a thumbnail for the highlight clip and storing the thumbnail with the metadata and the highlight clip.

4. A method as recited in claim 2 wherein prior to storing, formatting the highlight clip into a mobile format and an Internet format different than the mobile format.

5. A method as recited in claim 1 wherein prior to communicating a plurality of highlight links, selecting a plurality of sports teams to form selected teams and wherein communicating comprises communicating highlights links corresponding to the selected teams.

6. A method as recited in claim 1 wherein communicating a plurality of highlight links to a user device comprises communicating the plurality of highlight links from an ongoing live event.

7. A method as recited in claim 1 wherein communicating a plurality of highlight links to a user device comprises communicating the plurality of highlight links from a live event displayed in a video window in the user interface.

8. A method as recited in claim 1 wherein displaying the plurality of highlight links comprises displaying the plurality of highlight links in reverse chronological order.

9. A method as recited in claim 1 wherein displaying the plurality of highlight links comprises displaying the plurality of highlight links with a thumbnail for each of the plurality of highlight links.

10. A method as recited in claim 1 wherein displaying the plurality of highlight links comprises displaying the plurality of highlight links in the second display partially over first the video display area.

11. A method as recited in claim 1 wherein communicating a plurality of highlight links comprises communicating a plurality of highlight links in time order.

12. A method as recited in claim 1 wherein communicating highlights links comprises communicating highlight links for a sporting event.

13. A method as recited in claim 1 wherein communicating highlights links comprises communicating highlight links for a plurality of sporting events.

14. A method as recited in claim 1 wherein communicating a highlight clip comprises communicating highlights for user-selectable sporting events.

15. A method as recited in claim 1 wherein communicating a plurality of highlight links comprises continually communicating highlight links of a live event.

16. A method as recited in claim 1 wherein communicating a plurality of highlight links to a user device comprises communicating the plurality of highlight links to a mobile device.

17. A method as recited in claim 1 wherein communicating a plurality of highlight links to a user device comprises communicating the plurality of highlight links to a set top box.

18. A method as recited in claim 1 further comprising:
 selecting a team from a plurality of teams to form a team selection;
 communicating the team selection to a content delivery network;
 and wherein communicating a plurality of highlight links to a user device comprises communicating the plurality of highlight links corresponding to the team selection.

19. A method as recited in claim 18 wherein selecting a team comprises selecting a team from a pull down menu displayed in a highlights area of the user interface.

20. A method as recited in claim 1 wherein displaying the plurality of highlight links comprises continually updating the plurality of highlight links.

21. A system comprising:
 a user device having a screen display with a user interface, said screen display comprising a first video display area displaying a live feed and a second display area; and
 a content processing system located remotely from the user device communicating a plurality of highlight links to the user device, said highlight links corresponding to highlight clips of selected portions of the live feed;
 a content delivery network;
 said user device displaying the plurality of highlight links in the second display area of the display, said user device communicating a selection signal corresponding to a first highlight link of the plurality of highlight links to the content delivery network;
 said content delivery network communicating a first highlight clip corresponding to the first highlight link of the selection signal to the user device;
 said user device displaying the first highlight clip in the first video display area in response to communicating the first highlight clip and redisplaying the live feed in the first video display area when the highlight clip is complete.

22. A system as recited in claim 21 wherein the content processing system receives a plurality of live feeds for a plurality of events, selects portions of the events to form video clips, associates metadata to the video clips and stores the video clip and the metadata.

23. A system as recited in claim 22 wherein the content processing system stores a thumbnail with the metadata and the video clip.

24. A system as recited in claim 22 wherein the content processing system formats the video clip into a mobile format and an Internet format.

25. A system as recited in claim 22 wherein the user interface comprises selections for selecting a plurality of sports teams to form selected teams and wherein the content processing system communicates highlights links corresponding to the selected teams.

26. A system as recited in claim 21 wherein the highlight links comprise live event highlight links.

27. A system as recited in claim 21 wherein the first video display area, and the second display area are simultaneously displayed on the screen display.

28. A system as recited in claim 21 wherein the user interface displays the plurality of highlight links in time order.

29. A system as recited in claim 21 wherein the highlights links comprise highlight links for one sporting event.

30. A system as recited in claim 21 wherein the highlights links comprise highlight links for a plurality of sporting events.

31. A system as recited in claim 21 wherein the user device comprises a mobile device.

32. A system as recited in claim 21 wherein the user device comprises a set top box.

33. A system as recited in claim 21 wherein the user interface comprises a team selector for forming a plurality of teams to form a team selection, said content processing system communicating a plurality of highlight links to the user device corresponding to the team selection.

34. A system as recited in claim 33 wherein the team selector is disposed in a pull down menu displayed in a highlights area of the user interface.

* * * * *